US010822703B2

(12) United States Patent
Kirste et al.

(10) Patent No.: US 10,822,703 B2
(45) Date of Patent: Nov. 3, 2020

(54) PROCESS FOR PRETREATMENT OF PLASTIC SURFACES FOR METALLIZATION

(71) Applicant: BASF SE, Ludwigshafen (DE)

(72) Inventors: Axel Kirste, Limburgerhof (DE); Tobias Urban, Bensheim (DE); Fabio Nicolini, Mutterstadt (DE); Simone Lutter, Ludwigshafen (DE); Frank Richter, Frankenthal (DE); Andre Cezanne, Cologne (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/748,278

(22) PCT Filed: Jul. 21, 2016

(86) PCT No.: PCT/EP2016/067364
§ 371 (c)(1),
(2) Date: Jan. 29, 2018

(87) PCT Pub. No.: WO2017/016964
PCT Pub. Date: Feb. 2, 2017

(65) Prior Publication Data
US 2018/0216233 A1 Aug. 2, 2018

(30) Foreign Application Priority Data
Jul. 30, 2015 (EP) .................................... 15179094

(51) Int. Cl.
C23C 28/02 (2006.01)
C23C 18/20 (2006.01)
(Continued)

(52) U.S. Cl.
CPC ............. C23C 18/2086 (2013.01); C08J 7/06 (2013.01); C08J 7/12 (2013.01); C23C 18/1641 (2013.01);
(Continued)

(58) Field of Classification Search
CPC ............ C23C 18/1653; C23C 18/1851; C23C 18/1886; C23C 28/02
(Continued)

(56) References Cited

U.S. PATENT DOCUMENTS 3,698,919 A * 10/1972 Kuzmik .................. C23C 18/28
106/1.11
3,736,170 A * 5/1973 Lo ........................... C23C 18/22
427/304

(Continued)

FOREIGN PATENT DOCUMENTS

CN 101745290 A * 6/2010 ............. B01D 53/14
DE 100 54 544 A1 5/2002
(Continued)

OTHER PUBLICATIONS

International Search Report and Written Opinion of the International Searching Authority dated Oct. 18, 2016 in PCT/EP2016/067364, 10 pages.
(Continued)

Primary Examiner — Edna Wong
(74) Attorney, Agent, or Firm — Oblon, McClelland, Maier & Neustadt, L.L.P.

(57) ABSTRACT

The invention relates to a process for coating plastics or plastic surfaces with metals, especially plastics composed of acrylonitrile/butadiene/styrene copolymers (ABS) and composed of mixtures of these copolymers with other plastics (e.g. ABS blends), wherein the process comprises the pretreatment of the plastic surfaces with a composition C (etch solution) comprising at least two different ionic liquids IL1 and IL2.

10 Claims, 2 Drawing Sheets

(51) Int. Cl.
*C23C 18/26* (2006.01)
*C25D 5/56* (2006.01)
*C08J 7/06* (2006.01)
*C23C 18/30* (2006.01)
*C08J 7/12* (2006.01)
*C23C 18/16* (2006.01)
*C23C 18/34* (2006.01)
*C23C 18/40* (2006.01)
*C25D 3/04* (2006.01)
*C25D 3/12* (2006.01)
*C25D 3/38* (2006.01)
*C25D 5/54* (2006.01)

(52) U.S. Cl.
CPC .......... *C23C 18/1653* (2013.01); *C23C 18/26* (2013.01); *C23C 18/30* (2013.01); *C23C 18/34* (2013.01); *C23C 18/40* (2013.01); *C23C 28/023* (2013.01); *C25D 3/04* (2013.01); *C25D 3/12* (2013.01); *C25D 3/38* (2013.01); *C25D 5/54* (2013.01); *C25D 5/56* (2013.01); *C08J 2355/02* (2013.01)

(58) Field of Classification Search
USPC .................................................. 205/167, 169
See application file for complete search history.

(56) References Cited

U.S. PATENT DOCUMENTS

| 2004/0086646 | A1 | 5/2004 | Brandes et al. |
| 2006/0100323 | A1 | 5/2006 | Schmidt et al. |
| 2008/0028777 | A1 | 2/2008 | Boesmann et al. |
| 2008/0114105 | A1 | 5/2008 | Hell et al. |
| 2009/0300946 | A1 | 12/2009 | Egbers et al. |
| 2010/0267942 | A1* | 10/2010 | Buchanan ............... C08B 1/003 536/124 |
| 2010/0305249 | A1 | 12/2010 | Buchanan et al. |
| 2012/0041080 | A1 | 2/2012 | Buchanan et al. |
| 2012/0073978 | A1* | 3/2012 | Malkowsky ........ C23C 18/1601 205/164 |
| 2012/0121830 | A1 | 5/2012 | Buchanan et al. |
| 2014/0343271 | A1 | 11/2014 | Buchanan et al. |

FOREIGN PATENT DOCUMENTS

| DE | 10 2009 003 011 A1 | 11/2009 |
| WO | WO 2004/005391 A1 | 1/2004 |
| WO | WO 2005/113702 A1 | 12/2005 |
| WO | WO 2007/090755 A1 | 8/2007 |
| WO | WO 2008/006422 A1 | 1/2008 |
| WO | WO 2008/006422 A3 | 1/2008 |
| WO | WO 2008/043837 A1 | 4/2008 |
| WO | WO 2008/102747 A1 | 8/2008 |
| WO | WO 2010/142567 A1 | 12/2016 |

OTHER PUBLICATIONS

International Preliminary Report on Patentability dated Sep. 25, 2017 in PCT/EP2016/067364 filed Jul. 21, 2016, 6 pages.
Dr. Kurt Heymann, et al. "Kunststoff-Metallisierung", Handbuch für Theorie und Praxis ["Plastic Metallization" Handbook for Theory and Practice] Eugen G. Leuze Verlag, Saulgau/Württ, 1991, pp. 44-55 and cover pages.
"Standard Practice for Preparation of Plastic Materials for Electroplating, Designation: B727-83" Annual Book of ASTM Standard, Metallic and Inorganic Coatings; Metal Powders, Sintered P/M Structural Parts, vol. 02.05, 1995, pp. 446-450 and cover pages.
Mordechay Schlesinger, et al. "Electroless Deposition of Nickel" Modern Electroplating, Chapter 18, Fifth Edition, John Wiley & Sons Inc., ISBN 978-0-470-16778-6, 2010, pp. 447-458.

* cited by examiner

PROCESS FOR PRETREATMENT OF PLASTIC SURFACES FOR METALLIZATION

The invention relates to a process for coating plastics or plastic surfaces with metals, especially plastics composed of acrylonitrile/butadiene/styrene copolymers (ABS copolymers) and composed of mixtures of these copolymers with other plastics, also called ABS blends, wherein the process comprises the pretreatment of the plastic surfaces with a composition C (etch solution) comprising at least two different ionic liquids IL1 and IL2.

The coating of the surfaces of plastic parts with metals, also called plastic galvanizing, is becoming increasingly important. By plastic galvanizing methods, composite materials which combine advantages of plastics and metals are obtained. Plastic can be converted to virtually any desired shape by simple processing methods such as injection molding or extrusion. In addition, the use of plastic components can achieve a distinct reduction in weight in comparison to metal parts. Subsequent galvanization of the resultant plastic moldings is often conducted for decorative purposes or else to achieve shielding effects.

For example, sanitary fittings, automobile accessories, furniture hardware, costume jewelry and buttons/knobs are metallized either all over or else only partly, in order to impart an attractive appearance to the parts. In addition, plastics can also be metallized for functional reasons. For example, housings of electrical appliances are metallized in order to shield them from emission or immission of electromagnetic radiation. In addition, the surface properties of plastic parts can be altered in a controlled manner via metallic coatings. In very many cases, copolymers of acrylonitrile, butadiene and styrene (ABS copolymers) and mixtures of these copolymers with other polymers are used, for example blends of ABS and polycarbonate (ABS/PC blends).

For production of metallic coatings on plastic parts, the latter are usually secured in frames and contacted with a plurality of different treatment fluids in a particular process sequence. In a first step, for this purpose, the plastics are typically pretreated in order to remove impurities such as greases from the surface. Subsequently, etching methods are usually used to roughen the surface, such that the subsequent metal layers adhere with sufficient firmness. In the etching operation, the formation of a defined homogeneous structure in the form of recesses on the plastic surface is particularly crucial.

Thereafter, the roughened surface is treated with what are called activators in order to form a catalytic surface for a subsequent chemical metallization. For this purpose, it is often the case that either what are called ionogenic activators or colloidal systems are used.

"Kunststoffmetallisierung", Handbuch für Theorie und Praxis ["Plastic Metallization", Handbook for Theory and Practice] (Eugen G. Leuze Verlag, Saulgau, 1991, pages 46-47) states, for example, that plastic surfaces, for activation with ionogenic systems, are first treated with tin (II) ions, giving rise to firmly adhering gels of tin oxide hydrate after the treatment and rinsing with water. In the subsequent treatment with a palladium salt solution, palladium nuclei are formed on the surface through redox reaction with the tin (II) species, these being catalytic for the chemical metallization. For activation with colloidal systems, generally colloidal palladium solutions are used, formed by reaction of palladium chloride with tin (II) chloride in the presence of excess hydrochloric acid (Annual Book of ASTM Standard, Vol. 02.05 "Metallic and Inorganic Coatings; Metal Powders, Sintered P/M Structural Parts", Designation: B727-83, Standard Practice for Preparation of Plastic Materials for Electroplating, 1995, pages 446-450).

After the activation, the plastic parts are typically first chemically metallized, using a metastable solution of a metallization bath. These baths generally comprise the metal to be deposited in the form of salts in an aqueous solution and a reducing agent for the metal salt. Only when the chemical metallization baths come into contact with the metal nuclei on the plastic surface, for example with the palladium nuclei, is metal formed by reduction, which is deposited on the surface as a firmly adhering layer. Often deposited in the chemical metallization step are copper, nickel or a nickel alloy with phosphorus and/or boron.

It is then possible to electrolytically deposit further metal layers onto the plastic surfaces coated with the aid of the chemical metallization bath. It is often the case that there is first an electrolytic deposition of copper layers or further nickel layers before the desired decorative chromium layer is applied electrochemically.

A critical process step in plastic galvanizing is the pretreatment of the plastic surface. One reason why a pretreatment is necessary is to improve, and typically to actually enable, the adhesion of the metal on the plastic surface. For this purpose, the plastic surface is roughened and should obtain more hydrophilic properties. In this context, the formation of a defined homogeneous structure in the form of recesses on the plastic surface is particularly crucial. These recesses serve, in the later metallization steps, as the starting point for the growth of the metal nuclei.

Since roughening has also been conducted by mechanical methods at an earlier stage, swelling and etching of the plastic surface with chemicals has nowadays become established for this purpose. The most commonly used etchant is the chromium-sulfuric acid etchant (chromium trioxide in sulfuric acid), especially for ABS (acrylonitrile-butadiene-styrene copolymer) or else polycarbonate. Chromium-sulfuric acid etchant is very toxic and requires special precautions in the process procedure, aftertreatment and disposal. Because of chemical processes in the etching process, for example the reduction of the chromium compound used, the chromium-sulfuric acid etchant is used up and is generally not reusable.

A process for chemical metallizing of plastic surfaces using a chromium-containing etch solution is described, for example, in DE-A 100 54 544.

Also known in the prior art is the use of ionic liquids for pretreatment (etching) of plastic surfaces in the context of a metallization. WO 2010/142567 describes a process for coating plastics with metal, wherein the plastics are pretreated with a composition comprising at least one salt having a melting point of less than 100° C. at 1 bar (ionic liquid). The pretreatment of various thermoplastics is described, for example polyamides, polyolefins, polyesters, polyethers, polystyrene and copolymers of styrene, for example acrylonitrile/butadiene/styrene copolymer (ABS).

Ionic liquids have been known since the end of the forties. They are fluid salt melts which are liquid below 100° C., preferably at room temperature (25° C., 1 bar) and especially at temperatures below room temperature. Ionic liquids are a novel class of solvents having nonmolecular, ionic character.

Typical cation/anion combinations which lead to ionic liquids are, for example, dialkylimidazolium, pyridinium, ammonium and phosphonium cations with halide, tetrafluoroborate, methylsulfate anions. In addition, there are many further conceivable combinations of cations and anions that lead to low-melting salts.

The use of ionic liquids in a wide variety of different technical fields is known. In connection with polymers, use of ionic liquids as antistats or else as plasticizers has been described in the prior art, for example in WO 2004/005391, WO 2007/090755 and WO 2008/006422. Document DE 10 2009 003 011 discloses the use of ionic liquids as adhesives for polymers.

It is an object of the present invention to provide a process for coating plastics or plastic surfaces with metals, in which the disadvantageous chromium-containing etch solutions used to date are no longer required and wherein a further improvement is achieved compared to the use of known etch solutions; more particularly, an improvement is achieved over the ionic liquids described in WO 2010/142567. An improvement is achieved firstly through improved strength and bonding of the metal layer on the plastic surface and secondly through improvement in process technology, such as lower entrainment of the etch solution.

Furthermore, the etch solution used should if at all possible be reusable, environmentally friendly, nontoxic and/or biodegradable. More particularly, the etch solution should be suitable for a maximum number of plastics.

The present invention relates to a process for coating plastic or plastic surfaces with metals, comprising the steps of
a) pretreating the plastic with a composition C (etch composition) comprising at least two different ionic liquids IL1 and IL2, the first ionic liquid IL1 comprising, as cation, at least one (preferably exactly one) alkylammonium cation and the second ionic liquid IL2 comprising, as cation, at least one (preferably exactly one) aromatic heterocycle having a delocalized cationic charge and comprising at least one nitrogen atom;
b) treating the plastic from step a) with an activator composition A comprising at least one ionogenic and/or colloidal activator, especially at least one palladium component P, preferably at least one colloidal palladium component P;
c) treating the plastic from step b) with an accelerator composition B comprising an acid and/or a reducing agent;
d) chemically depositing a metal layer, preferably a metal layer consisting essentially of nickel, copper, chromium or alloys thereof, by treating the plastic (or the plastic surface) from step c) with a coating composition M1 comprising at least one metal salt, preferably at least one metal salt selected from nickel, copper and chromium salts, and at least one reducing agent, preferably a-situ reducing agent;
e) electrochemically coating the plastic (or the plastic surface) from step d) with at least one further metal layer, preferably a metal layer consisting essentially of copper and/or a metal layer consisting essentially of chromium, by electrochemically treating the plastic (or the plastic surface) from step d) with at least one coating composition M' comprising at least one metal compound, especially at least one metal salt, preferably at least one copper salt, a chromium salt and/or chromic acid.

It is a feature of the process according to the invention that a further distinct improvement in the coating outcome and the process conditions can be achieved compared to the known use of ionic liquids. It is additionally advantageous that, in the process of the invention, the plastic surface is etched without metal salts, and it is possible to dispense with the use of the toxic and disadvantageous chromium-containing etch solutions.

The invention further relates to a composition C for pretreatment (etching) of a plastic surface in the course of a process for coating plastics with metals.

The invention additionally relates to the use of the composition C of the invention for pretreatment (etching) of a plastic surface in the course of a process for coating plastics with metals.

The composition C of the invention has the advantage, particularly over the chromic acid-containing etch solutions of the prior art, of being biodegradable, preferably completely biodegradable. Moreover, the composition of the invention especially does not comprise any toxic and/or environmentally harmful constituents.

Compared to the known use of ionic liquids, it is possible to achieve a further distinct improvement in the coating outcome, such as better adhesion of the subsequent metal layers on the plastic surface. The compositions C of the invention additionally feature a lower viscosity, which assures a lower entrainment loss of etch composition in the process of the invention.

A standard definition of ionic liquids delimits them from the known salt melts by a melting point of below 100° C., preferably below 80° C., or else even below room temperature. In the context of this application, ionic liquids shall be understood to mean those salts which, in the pure state, have a melting point of less than 100° C. at 1 bar.

Plastics and Metals

Figure 1:
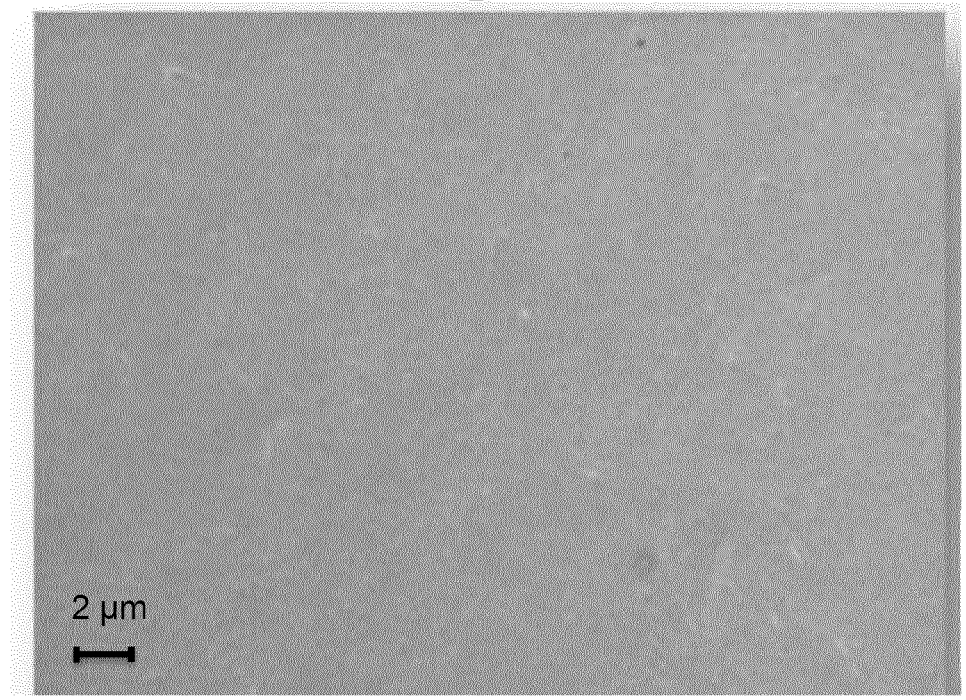
FIG. 1 shows the ABS surface prior to etching.

In the process of the invention, moldings made from plastics, especially from plastics having a nonconductive surface, are coated with a metal in a plurality of steps. They are preferably thermoplastics. Thermoplastics can be melted and converted to the desired shape by different methods, for example injection molding, extrusion, thermoforming or blow molding.

Suitable thermoplastics include polyamides, polyolefins, polyesters, polyethers, polyacetals, especially polyoxymethylene, polycarbonates, polyurethanes, polyacrylates, polystyrenes or copolymers of styrene, especially styrene/acrylonitrile copolymers (SAN), acrylic ester/styrene/acrylonitrile copolymers (ASA) and acrylonitrile/butadiene/styrene copolymers (ABS).

Polyamides include polycondensates of aminocarboxylic acids, for example of 6-aminocarboxylic acid or epsilon-caprolactam, or polycondensates of diamino compounds and dicarboxylic acids, for example of hexane-1,6-diamine and adipic acid.

Suitable polyolefins are polyethylene, polypropylene and copolymers of ethylene or propylene.

Suitable polyesters are polycondensation products of polyhydric alcohols, for example butanediol, hexanediol, glycerol or trimethylolpropane, and polybasic carboxylic acids, especially phthalic acid and isomers thereof, adipic acid or trimellitic anhydride.

A particular polyacetal is polyoxymethylene (POM).

Polycarbonates are esters of carbonic acid and polyhydric alcohols, for example bisphenol A; also mentioned are polyestercarbonates comprising further polybasic carboxylic acids as formation components.

Typically, polyethers comprise recurrent ether groups. Of particular industrial significance are, for example, polyetherimides especially comprising aromatic ring systems joined via recurrent ether and imide groups, polyether ketones especially comprising phenylene groups joined by recurrent ether and ketone groups, polyether sulfides comprising ether and thioether groups in their polymer backbone, and polysulfones comprising recurrent ether groups and sulfone groups in their polymer backbone.

Polyurethanes are typical polyadducts formed from polyfunctional isocyanates and polyhydric alcohols, useful examples being both aliphatic and aromatic compounds. Polyacrylates are homo- or copolymers of acrylic monomers or methacrylic monomers; a particular example is polymethylmethacrylate (PMMA).

It is also possible to carry out the process of the invention, wherein the plastic comprises (or consist of) an carbon-fibre-reinforced epoxy resin. Carbon-fibre-reinforced epoxy resins are commonly known and typically comprises 10 to 90%, preferably about 50 to 70% by volume, reinforcing carbon-fibre. Suitable epoxy resins are polyethers which are obtained by reaction of an compound having hydroxyl groups, e.g. bisphenol, with an epoxy compound, e.g. epichlorohydrine. Typically, epoxy resins may be cured by reaction with an hardener, e.g. amines, acids, acid anhydrides, thiols.

Preferred polymers are homo- and copolymers of styrene, such as polystyrene, styrene/acrylonitrile copolymer and especially acrylonitrile/butadiene/styrene copolymers (ABS).

A preferred embodiment relates to the process of the invention described, wherein the plastic comprises (or consist of) a plastic selected from polyamides, polyolefins, polyesters, polyethers, polyacetals, polycarbonate, polyurethanes, polyacrylates, polystyrene or copolymers of styrene selected from styrene/acrylonitrile copolymers (SAN), acrylic ester/styrene/acrylonitrile copolymers (ASA) and acrylonitrile/butadiene/styrene copolymers (ABS). The plastic to be coated may also comprise blends consisting of two or more of the plastics mentioned and/or plastic parts consisting of two or more of the plastics mentioned (two-component plastics or two-component plastic moldings).

A further preferred embodiment relates to the process of the invention described, wherein the plastic comprises (or consists of) one or more of plastics selected from polyamides, polyolefins, polyesters, polyethers, polyacetals, polycarbonate, polyurethanes, polyacrylates, polystyrene or copolymers of styrene selected from styrene/acrylonitrile copolymers (SAN), acrylic ester/styrene/acrylonitrile copolymers (ASA), acrylonitrile/butadiene/styrene copolymers (ABS) and carbon-fibre-reinforced epoxy resins.

A preferred embodiment relates to the process of the invention described, wherein the plastic comprises polyamides, polystyrenes or copolymers of styrene selected from styrene/acrylonitrile copolymers (SAN), acrylic ester/styrene/acrylonitrile copolymers (ASA) and acrylonitrile/butadiene/styrene copolymers (ABS), or blends and/or multicomponent plastics comprising at least two of the plastics mentioned.

Particularly preferred plastics are polyamides and ABS. Most preferably, the plastic comprises acrylonitrile/butadiene/styrene copolymer (ABS) or a blend, for example ABS/PC (acrylonitrile/butadiene/styrene copolymers/polycarbonate) and/or a multicomponent plastic comprising ABS. ABS is supplied, for example, under the Terluran® trade name by Styrolution.

The articles to be coated may consist entirely of one or more of the above plastics. Articles of this kind may have any desired shape and are obtainable, for example, by thermoplastic forming methods such as injection molding, extrusion, thermoforming and blow molding.

Alternatively, they may consist of various materials; what is essential is that the surface to be coated is composed of plastic.

In the process of the invention, the plastics or the plastic surfaces are coated with metals. Useful metals include, for example, nickel, aluminium, copper, chromium, tin or zinc and alloys thereof. The metal may be applied in one or preferably in more than one layer or operation. It is possible with preference to apply layers of different metals, especially at least three different metal layers.

A preferred embodiment relates to the process of the invention described, wherein the metals comprise at least one metal selected from nickel, aluminium, copper, chromium, tin, zinc and alloys thereof.

Ionic Liquids IL

The composition C used in the process of the invention comprises at least two different salts having a melting point of less than 100° C. at 1 bar (called ionic liquid hereinafter). According to the invention, the composition C (etch composition) comprises at least two different ionic liquids IL1 and IL2, the first ionic liquid IL1 comprising, as cation, at least one alkylammonium cation and the second ionic liquid IL2 comprising, as cation, at least one aromatic heterocycle having a delocalized cationic charge and comprising at least one nitrogen atom.

The composition C may comprise further ionic liquids in addition to the ionic liquids IL1 and IL2. In a preferred embodiment, the composition C comprises, as ionic liquids, exclusively ionic liquids selected from IL1 and IL2.

Preferably, the ionic liquids, especially the ionic liquids IL1 and IL2, have a melting point of less than 100° C., more preferably less than 85° C. and most preferably less than 60° C., in each case at 1 bar (standard conditions).

The molar mass of the ionic liquids, especially the ionic liquids IL1 and IL2, is preferably less than 2000 g/mol, more preferably less than 1500 g/mol, more preferably less than 1000 g/mol and most preferably less than 750 g/mol; in a particular embodiment, the molar mass is between 100 and 750 or between 100 and 500 g/mol.

Preferred ionic liquids comprise at least one organic compound as a cation; most preferably, they comprise exclusively organic compounds as cations. Suitable organic cations are especially organic compounds having heteroatoms, such as nitrogen, sulfur or phosphorus; particular preference is given to organic compounds having a cationic group selected from an ammonium group, a sulfonium group and a phosphonium group. The ionic liquids, especially the ionic liquids IL1 and/or IL2, may comprise salts of the general formula $[A]_n+[X]^{n-}$ where n is 1, 2, 3 or 4, $[A]^+$ is an ammonium cation or a phosphonium cation, and $[X]^{n-}$ is a mono-, di-, tri- or tetravalent anion.

The ionic liquids, especially the ionic liquids IL1 and/or IL2, may also comprise mixed salts comprising at least two different organic cations $[A]^+$ or mixed salts comprising at least one organic cation $[A]^+$ and one or two different mono-, di-, tri- or tetravalent metal cations $[M]^{n+}$.

Ionic Liquid IL1

According to the invention, the ionic liquid IL1 comprises, as cation, at least one, preferably exactly one, alkylammonium cation. In the context of the present invention, alkylammonium cation is understood to mean ammonium compounds having at least one $C_{1-20}$-alkyl radical, preferably a $C_{1-18}$-alkyl radical, preferably a $C_{1-12}$-alkyl radical, more preferably a $C_{1-6}$-alkyl radical, and a localized positive charge on the nitrogen atom. The compounds may be those having tetravalent nitrogen (quaternary ammonium compounds) or else be compounds having trivalent nitrogen, where one bond is a double bond. Preferably, the alkylammonium cation is a nonaromatic compound.

Useful ring systems include monocyclic, bicyclic, nonaromatic ring systems. Examples include bicyclic systems as described in WO 2008/043837. The bicyclic systems of WO 2008/043837 are diazabicyclo derivatives, preferably composed of one 7-membered and one 6-membered ring comprising an amidinium group; a particular example is the 1,8-diazabicyclo(5.4.0)undec-7-enium cation.

Preferably, the ionic liquid IL1 comprises, as the sole cation, exactly one alkylammonium cation. The ionic liquid IL1 may alternatively be a mixed salt comprising at least one alkylammonium cation and at least one further organic cation $[A]^+$ and/or at least one further metal cation $[M]^{n+}$.

Particularly preferred organic cations are quaternary ammonium cations having preferably four $C_{1-12}$-alkyl groups as substituents on the nitrogen atom. Particular preference is also given to organic cations comprising a heterocyclic ring system having one or two nitrogen atoms as part of the ring system. The alkylammonium cation of the ionic liquid IL1 may also be a ring system comprising at least one tetra- and/or trivalent nitrogen (where one bond is a double bond). For example, the cation of the ionic liquid IL1 may be a cyclic nonaromatic alkylammonium cation selected from the group consisting of piperidinium cations, pyrazolium cations, pyrazolinium cations, imidazolinium cations, pyrrolidinium cations, imidazolidinium cations, guanidiumium cations and cholinium cations. Preference is also given to ionic liquid IL1 comprising at least one dialkylpyrrolidinium cation or at least one dialkylpiperidinium cation.

More particularly, the ionic liquid IL1 is an ionic liquid comprising, as cation, at least one, preferably exactly one, alkylammonium cation of the general formula (I)

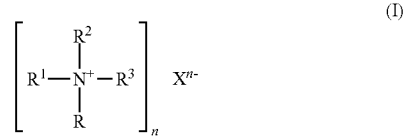

(I)

wherein

R is an organic group comprising 1 to 20, preferably 1 to 18, more preferably 1 to 12 and especially preferably 1 to 6 carbon atoms, where the organic group is a saturated or unsaturated, acyclic or cyclic aliphatic radical which may be unsubstituted or may be interrupted or substituted by 1 to 5 heteroatoms or functional groups;

$R^1$, $R^2$ and $R^3$ are each independently:
hydrogen;
halogen, especially fluorine, chlorine, bromine and iodine, preferably chlorine;
a $C_1$-$C_{18}$-alkyl radical which may optionally be substituted by functional groups selected from $C_1$-$C_6$-alkyl, $C_1$-$C_6$-alkyloxy, $C_1$-$C_6$-alkoxycarbonyl, hydroxyl, halogen, amino, cyano and sulfo and/or may be interrupted by one or more oxygen and/or sulfur atoms and/or one or more substituted or unsubstituted imino groups;

a $C_2$-$C_{18}$-alkenyl radical which may optionally be substituted by functional groups selected from $C_1$-$C_6$-alkyl, $C_1$-$C_6$-alkyloxy, $C_1$-$C_6$-alkoxycarbonyl, hydroxyl, halogen, amino, cyano and sulfo and/or may be interrupted by one or more oxygen and/or sulfur atoms and/or one or more substituted or unsubstituted imino groups;

a $C_5$-$C_{12}$-cycloalkyl radical which may optionally be substituted by functional groups selected from $C_1$-$C_6$-alkyl, $C_1$-$C_6$-alkyloxy, $C_1$-$C_6$-alkoxycarbonyl, hydroxyl, halogen, amino, cyano and sulfo;

a $C_5$-$C_{12}$-cycloalkenyl radical which may optionally be substituted by functional groups selected from $C_1$-$C_6$-alkyl, $C_1$-$C_6$-alkyloxy, $C_1$-$C_6$-alkoxycarbonyl, hydroxyl, halogen, amino, cyano and sulfo; or a five- to six-membered heterocycle which includes oxygen, nitrogen and/or sulfur atoms and may optionally be substituted by functional groups selected from $C_1$-$C_6$-alkyl, $C_1$-$C_6$-alkyloxy, $C_1$-$C_6$-alkoxycarbonyl, hydroxyl, halogen, amino, cyano and sulfo, or two adjacent $R^1$, $R^2$ and $R^3$ radicals together with the nitrogen atom in formula (I) are an unsaturated or saturated five to seven-membered ring which may optionally be substituted by functional groups selected from $C_1$-$C_6$-alkyl, $C_1$-$C_6$-alkyloxy, $C_1$-$C_6$-alkoxycarbonyl, hydroxyl, halogen, amino, cyano and sulfo and may optionally be interrupted by one or more oxygen and/or sulfur atoms and/or one or more substituted or unsubstituted imino groups;

X is an anion; and
n is 1, 2 or 3.

Possible heteroatoms in the definition of the R and $R^1$ to $R^3$ radicals are in principle any heteroatoms capable in a formal sense of replacing a —$CH_2$—, a —CH=, a —C≡ or a =C= group. If the carbon-comprising radical comprises heteroatoms, preference is given to oxygen, nitrogen, sulfur, phosphorus and silicon. Preferred groups especially include —O—, —S—, —SO—, —$SO_2$—, —NR'—, —N=, —PR'—, —POR'— and —$SiR'_2$—, where the R' radicals are the remaining portion of the radical comprising carbon atoms.

Possible functional groups are in principle all functional groups which can be bonded to a carbon atom or a heteroatom. Suitable examples include —OH (hydroxyl), =O (especially in the form of a carbonyl group), —$NH_2$ (amino), =NH (imino), —COOH (carboxyl), —$CONH_2$ (carboxamide), —$SO_3H$ (sulfo) and —CN (cyano). Functional groups and heteroatoms may also be directly adjacent, and so combinations of a plurality of adjacent atoms, for instance —O— (ether), —S— (thioether), —COO— (ester), —CONH— (secondary amide) or —CONR'— (tertiary amide), are encompassed as well, for example di($C_1$-$C_4$-alkyl)amino, $C_1$-$C_4$-alkyloxycarbonyl or $C_1$-$C_4$-alkyloxy.

Halogens are fluorine, chlorine, bromine and iodine.
Preferably, the R radical is
an unbranched or branched $C_1$-$C_{20}$-alkyl radical which is unsubstituted or mono- to polysubstituted by hydroxyl, halogen, cyano, $C_1$-$C_6$-alkoxycarbonyl and/or sulfo and preferably has a total of 1 to 20 carbon atoms, for example methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, 1-heptyl, 1-octyl, 1-nonyl, 1-decyl, 1-undecyl, 1-dodecyl, 1-tetradecyl, 1-hexadecyl, 1-octadecyl, 2-hydroxyethyl, 2-cyanoethyl, 2-(methoxycarbonyl)ethyl, 2-(ethoxycarbonyl)ethyl, 2-(n-butoxycarbonyl)ethyl, 6-hydroxyhexyl and propylsulfo;

glycols, butylene glycols and oligomers thereof having 1 to 100, preferably 1 to 6 and especially preferably having 1 to 3 units and a hydrogen or a $C_1$-$C_6$-alkyl as end group, for example $R^AO—(CHR^B—CH_2—O)_p—CHR^B—CH_2—$ or $R^AO—(CH_2CH_2CH_2CH_2O)_p—CH_2CH_2CH_2CH_2O—$ where $R^A$ and $R^B$ are preferably hydrogen, methyl or ethyl and p is preferably 0 to 3, especially 3-oxabutyl, 3-oxapentyl, 3,6-dioxaheptyl, 3,6-dioxaoctyl, 3,6,9-trioxadecyl, 3,6,9-trioxaundecyl, 3,6,9,12-tetraoxatridecyl and 3,6,9,12-tetraoxatetradecyl;

vinyl;

or an unsubstituted $C_5$-$C_{12}$-cycloalkenyl radical.

More preferably, the R radical is an unbranched and unsubstituted $C_1$-$C_{18}$-alkyl radical, preferably $C_1$-$C_{12}$-alkyl, for example methyl, ethyl, 1-propyl, 1-butyl, 1-pentyl, 1-hexyl, 1-heptyl, 1-octyl, or is $CH_3O—(CH_2CH_2O)—CH_2CH_2—$ and $CH_3CH_2O—(CH_2CH_2O)—CH_2CH_2—$ with p=0 to 3.

Preferably, the $R^1$, $R^2$ and $R^3$ radicals are each independently hydrogen;

a $C_1$-$C_{18}$-alkyl radical optionally mono- to polysubstituted by functional groups selected from $C_1$-$C_6$-alkyl, $C_1$-$C_6$-alkyloxy, $C_1$-$C_6$-alkoxycarbonyl, hydroxyl, halogen, amino, cyano and sulfo, for example methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, 1-heptyl, 1-octyl, 1-nonyl, 1-decyl, 1-undecyl, 1-dodecyl, 1-tetradecyl, 1-hexadecyl, 1-octadecyl, 2-hydroxyethyl, 2-cyanoethyl, 2-cyanopropyl, 2-(methoxycarbonyl)ethyl, 2-(ethoxycarbonyl)ethyl, 2-(n-butoxycarbonyl)ethyl, 2-hydroxyethyl, 2-hydroxypropyl, 3-hydroxypropyl, 4-hydroxybutyl, 6-hydroxyhexyl, 2-aminoethyl, 2-aminopropyl, 3-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl, 6-ethoxyhexyl, chloromethyl, 2-chloroethyl, trichloromethyl, 1,1-dimethyl-2-chloroethyl, methoxymethyl, 2-butoxyethyl, diethoxymethyl, diethoxyethyl, 2-isopropoxyethyl, 2-butoxypropyl, 2-octyloxyethyl, 2-methoxyisopropyl and propylsulfo;

a $C_5$-$C_{12}$-cycloalkyl radical which may optionally be substituted by $C_1$-$C_6$-alkyl; for example cyclopentyl and cyclohexyl;

glycols, butylene glycols and oligomers thereof having 1 to 100, preferably 1 to 6 and especially preferably having 1 to 3 units and a hydrogen or a $C_1$-$C_6$-alkyl as end group, for example $R^AO—(CHR^B—CH_2—O)_p—CHR^B—CH_2—$ or $R^AO—(CH_2CH_2CH_2CH_2O)_p—CH_2CH_2CH_2CH_2O—$ where $R^A$ and $R^B$ are preferably hydrogen, methyl or ethyl and p is preferably 0 to 3, especially 3-oxabutyl, 3-oxapentyl, 3,6-dioxaheptyl, 3,6-dioxaoctyl, 3,6,9-trioxadecyl, 3,6,9-trioxaundecyl, 3,6,9,12-tetraoxatridecyl, 3,6,9,12-tetraoxatetradecyl, 5-hydroxy-3-oxapentyl, 8-hydroxy-3,6-dioxaoctyl, 11-hydroxy-3,6,9-trioxaundecyl, 7-hydroxy-4-oxaheptyl, 11-hydroxy-4,8-dioxaundecyl, 15-hydroxy-4,8,12-trioxapentadecyl, 9-hydroxy-5-oxanonyl, 14-hydroxy-5,10-dioxatetradecyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-dioxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl;

or two adjacent $R^1$, $R^2$ and $R^3$ radicals together with the nitrogen atom in formula (I) are a saturated unsubstituted five- to seven-membered ring; for example, two adjacent $R^1$, $R^2$ and $R^3$ radicals are 1,4-butylene, 1,5-pentylene or 3-oxa-1,5-pentylene.

In one embodiment, two adjacent $R^1$, $R^2$ and $R^3$ radicals together with the nitrogen atom in formula (I) may be an unsaturated or saturated five to seven-membered ring which may optionally be substituted by functional groups selected from $C_1$-$C_6$-alkyl, $C_1$-$C_6$-alkyloxy, $C_1$-$C_6$-alkoxycarbonyl, hydroxyl, halogen, amino, cyano and sulfo and may optionally be interrupted by one or more oxygen and/or sulfur atoms and/or one or more substituted or unsubstituted imino groups. Preferably, two adjacent $R^1$, $R^2$ and $R^3$ radicals together with the nitrogen atom in formula (I) form a saturated five to seven-membered ring and two adjacent $R^1$, $R^2$ and $R^3$ radicals are 1,4-butylene, 1,5-pentylene or 3-oxa-1,5-pentylene.

Most preferably, the $R^1$, $R^2$ and $R^3$ radicals are each independently hydrogen, unsubstituted $C_1$-$C_{18}$-alkyl, preferably $C_1$-$C_{12}$-alkyl (for example methyl, ethyl, 1-butyl, 1-pentyl, 1-hexyl, 1-heptyl, 1-octyl), 2-hydroxyethyl, 2-cyanoethyl, 2-(methoxycarbonyl)ethyl, 2-(ethoxycarbonyl)ethyl, 2-(n-butoxycarbonyl)ethyl, chlorine, $CH_3O—(CH_2CH_2O)_p—CH_2CH_2—$ or $CH_3CH_2O—(CH_2CH_2O)_p—CH_2CH_2—$ where p=0 to 3 or two adjacent $R^1$, $R^2$ and $R^3$ radicals are 1,4-butylene, 1,5-pentylene or 3-oxa-1,5-pentylene.

More preferably, $R^1$, $R^2$ and $R^3$ are a hydrogen atom or an above-described hydrocarbyl group having no further heteroatoms. Most preferably, $R^1$, $R^2$ and $R^3$ are a hydrogen atom or an unsubstituted $C_1$-$C_{18}$ alkyl group, more preferably a $C_1$-$C_6$ alkyl group, for example a methyl group, ethyl group, propyl group, isopropyl group or n-butyl group.

More preferably, the at least one ionic liquid IL1 comprises an alkylammonium cation of formula (I)

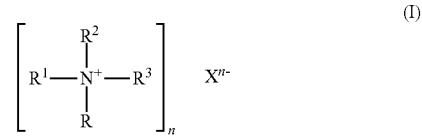

wherein

R is an unbranched and unsubstituted $C_1$-$C_{18}$-alkyl (for example methyl, ethyl, 1-propyl, 1-butyl, 1-pentyl, 1-hexyl, 1-heptyl, 1-octyl, 1-decyl, 1-dodecyl, 1-tetradecyl, 1-hexadecyl, 1-octadecyl, especially methyl, ethyl, 1-butyl and 1-octyl), $CH_3O—(CH_2CH_2O)_p—CH_2CH_2—$ or $CH_3CH_2O—(CH_2CH_2O)_p—CH_2CH_2—$ with p=0 to 3;

$R^1$, $R^2$ and $R^3$ are each independently:
a hydrogen atom, unsubstituted $C_1$-$C_{18}$-alkyl (for example methyl, ethyl, 1-butyl, 1-pentyl, 1-hexyl, 1-heptyl, 1-octyl), 2-hydroxyethyl, 2-cyanoethyl, 2-(methoxycarbonyl)ethyl, 2-(ethoxycarbonyl)ethyl, 2-(n-butoxycarbonyl)ethyl, chlorine, $CH_3O—(CH_2CH_2O)_p—CH_2CH_2—$ or $CH_3CH_2O—(CH_2CH_2O)_p—CH_2CH_2—$ with p=0 to 3, or two adjacent $R^1$, $R^2$ and $R^3$ radicals together with the nitrogen atom in formula (I) are a saturated unsubstituted five to seven-membered ring, for example, 1,4-butylene, 1,5-pentylene or 3-oxa-1,5-pentylene;

X is an anion; and n is 1, 2 or 3.

More preferably, the ionic liquid IL1 comprises an alkylammonium cation of formula (I) where R is $C_1$-$C_{18}$-alkyl, preferably $C_1$-$C_6$-alkyl, and $R^1$, $R^2$ and $R^3$ are each independently a hydrogen atom or $C_1$-$C_{18}$-alkyl, preferably $C_1$-$C_6$-alkyl;

or

R is $C_1$-$C_{18}$-alkyl, preferably $C_1$-$C_6$-alkyl; $R^1$ and $R^2$ together are 1,5-pentylene or 3-oxa-1,5-pentylene and $R^3$ is a hydrogen atom or $C_1$-$C_{18}$-alkyl, preferably $C_1$-$C_6$-alkyl.

Most preferred alkylammonium cations in the ionic liquid IL1 are methyltri(1-butyl)ammonium, 1-butyl-1-methylpyrrolidinium, N,N-dimethylpiperidinium and N,N-dimethylmorpholinium.

Preferred anions, especially preferred $X^{n-}$ anions according to formula (I), are described below in conjunction with the ionic liquid IL2 and apply correspondingly to the ionic liquid IL1.

Especially preferred are ionic liquids IL1 comprising, as cation, methyltri(1-butyl)ammonium and, as anion, an anion selected from chloride, bromide, hydrogensulfate, tetrachloroaluminate, thiocyanate, methylsulfate, ethylsulfate, methanesulfonate, formate, acetate, dimethylphosphate, diethylphosphate, p-tolylsulfonate, tetrafluoroborate and hexafluorophosphate.

Especially preferably, the ionic liquids IL1 are methyltri(1-butyl)ammonium methylsulfate (MTBS) or 1-butyl-1-methylpyrrolidinium dimethylphosphate, more preferably methyltri(1-butyl)ammonium methylsulfate (MTBS).

Ionic Liquid IL2

According to the invention, the ionic liquid IL2 may comprise, as cation, at least one aromatic heterocycle having a delocalized cationic charge and comprising at least one nitrogen atom, preferably one, two or three nitrogen atoms. More particularly, the at least one nitrogen atom, preferably one, two or three nitrogen atoms, is in the ring system of the heterocycle.

Preferably, the ionic liquid IL2 may comprise, as cation, exactly one aromatic heterocycle having a delocalized cationic charge and comprising at least one nitrogen atom. The ionic liquid IL2 may alternatively be a mixed salt comprising at least one aromatic heterocycle and at least one further organic cation $[A]^+$ and/or at least one further metal cation $[M]^{n+}$.

Most preferably, the ionic liquid IL2 comprises, as cation, a five- or six-membered heterocyclic aromatic ring system having one, two or three, preferably one or two, nitrogen atoms as part of the ring system. In principle, the five- or six-membered heterocyclic aromatic ring system may comprise one or two further heteroatoms, especially oxygen and/or sulfur atoms. The carbon atoms of the aromatic ring system may be substituted by organic groups having generally not more than 20 carbon atoms, preferably by a hydrocarbyl group, especially a $C_1$-$C_{16}$ alkyl group, especially a $C_1$-$C_{10}$ and more preferably a $C_1$-$C_4$ alkyl group.

Suitable cations of the at least one ionic liquid IL2 are, for example, the cations of the general formulae (IIa) to (IIi")

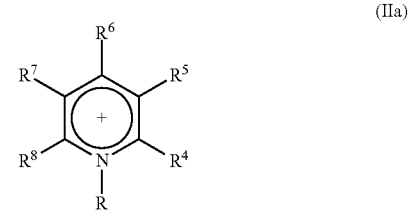

(IIa)

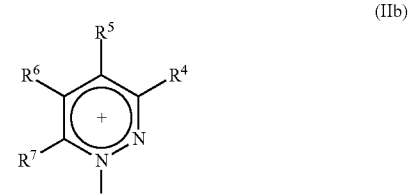

(IIb)

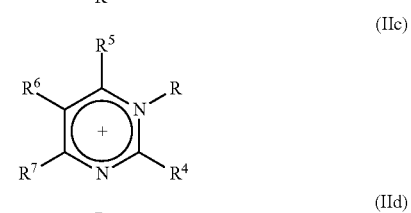

(IIc)

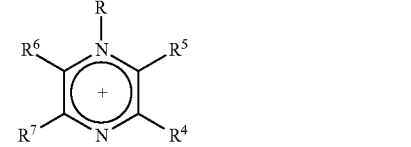

(IId)

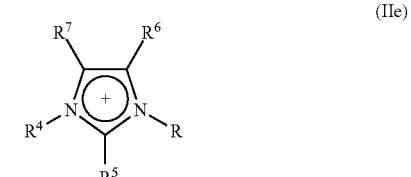

(IIe)

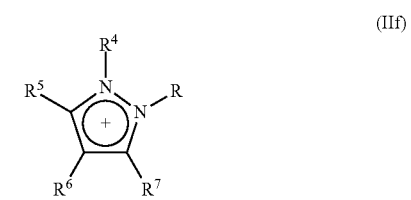

(IIf)

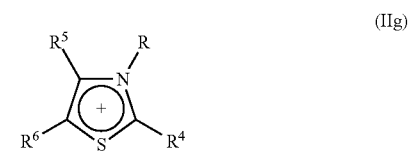

(IIg)

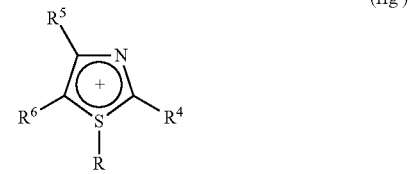

(IIg')

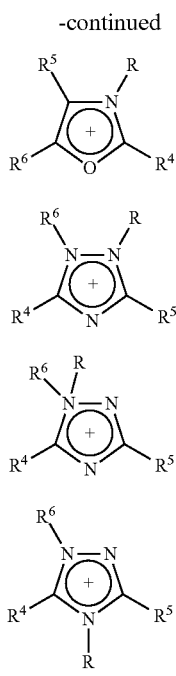

where R is as defined above and the $R^{45}$, $R^6$, $R^7$ and $R^8$ radicals are each as defined above for the $R^1$, $R^2$ and $R^3$ radicals. Preferably, the $R^4$, $R^5$, $R^6$, $R^7$ and $R^8$ radicals are each independently selected from hydrogen, methyl, ethyl, 1-propyl, 1-butyl and chlorine.

Preferably, the cation of the at least one ionic liquid IL2 is a cation of the abovementioned formulae (IIa), (IIe), (IIf), (IIg), (IIg') and (IIh).

Very particular preference is given to ionic liquids IL2 in which the cation is a pyridinium ion of the formula (IIa) where
one of the $R^4$, $R^5$, $R^6$, $R^7$ and $R^8$ radicals is methyl, ethyl or chlorine and the remaining $R^4$, $R^5$, $R^6$, $R^7$ and $R^8$ radicals are hydrogen; or
$R^6$ is dimethylamino and the remaining $R^4$, $R^5$, $R^7$ and $R^8$ radicals are hydrogen; or
all the $R^4$, $R^5$, $R^6$, $R^7$ and $R^8$ radicals are hydrogen; or
$R^5$ is carboxyl or carboxamide and the remaining $R^4$, $R^6$, $R^7$ and $R^8$ radicals are hydrogen; or
$R^4$ and $R^5$ or $R^5$ and $R^6$ are 1,4-buta-1,3-dienylene and the remaining $R^4$, $R^5$, $R^6$, $R^7$ and $R^8$ radicals are hydrogen.

Especially preferred are ionic liquids IL2 in which the cation is a pyridinium ion of the formula (IIa) where
all the $R^4$, $R^5$, $R^6$, $R^7$ and $R^8$ radicals are hydrogen; or
one of the $R^4$, $R^5$, $R^6$, $R^7$ and $R^8$ radicals is methyl or ethyl and the remaining $R^4$, $R^5$, $R^6$, $R^7$ and $R^8$ radicals are hydrogen.

Very particularly preferred pyridinium ions (IIa) include 1-methylpyridinium, 1-ethylpyridinium, 1-(1-butyl)pyridinium, 1-(1-octyl)pyridinium, 1-(1-hexyl)pyridinium, 1-(1-octyl)pyridinium, 1-(1-dodecyl)pyridinium, 1-(1-tetradecyl)pyridinium, 1-(1-hexadecyl)pyridinium, 1,2-dimethylpyridinium, 1-ethyl-2-methylpyridinium, 1-(1-butyl)-2-methylpyridinium, 1-(1-hexyl)-2-methylpyridinium, 1-(1-octyl)-2-methylpyridinium, 1-(1-dodecyl)-2-methylpyridinium, 1-(1-tetradecyl)-2-methylpyridinium, 1-(1-hexadecyl)-2-methylpyridinium, 1-methyl-2-ethylpyridinium, 1,2-diethylpyridinium, 1-(1-butyl)-2-ethylpyridinium, 1-(1-hexyl)-2-ethylpyridinium, 1-(1-octyl)-2-ethylpyridinium, 1-(1-dodecyl)-2-ethylpyridinium, 1-(1-tetradecyl)-2-ethylpyridinium, 1-(1-hexadecyl)-2-ethylpyridinium, 1,2-dimethyl-5-ethylpyridinium, 1,5-diethyl-2-methylpyridinium, 1-(1-butyl)-2-methyl-3-ethylpyridinium, 1-(1-hexyl)-2-methyl-3-ethylpyridinium and 1-(1-octyl)-2-methyl-3-ethylpyridinium, 1-(1-dodecyl)-2-methyl-3-ethylpyridinium, 1-(1-tetradecyl)-2-methyl-3-ethylpyridinium and 1-(1-hexadecyl)-2-methyl-3-ethylpyridinium.

Especially preferred are ionic liquids IL2 in which the cation is a pyridazinium cation of the formula (IIb) where
all the $R^4$, $R^5$, $R^6$ and $R^7$ radicals are hydrogen; or
one of the $R^4$, $R^5$, $R^6$ and $R^7$ radicals is methyl or ethyl and the remaining $R^4$, $R^5$, $R^6$ and $R^7$ radicals are hydrogen.

Especially preferred are ionic liquids IL2 in which the cation is a pyrimidinium cation of the formula (IIc) where
$R^4$ is hydrogen, methyl or ethyl and $R^5$, $R^6$ and $R^7$ are each independently hydrogen or methyl; or
$R^4$ is hydrogen, methyl or ethyl, $R^5$ and $R^6$ are methyl and $R^7$ is hydrogen.

Especially preferred are ionic liquids IL2 in which the cation is a pyrazinium cation of the formula (IId) where
$R^4$ is hydrogen, methyl or ethyl and $R^5$, $R^6$ and $R^7$ are each independently hydrogen or methyl; or
$R^4$ is hydrogen, methyl or ethyl, $R^5$ and $R^6$ are methyl and $R^7$ is hydrogen; or
$R^4$, $R^5$, $R^6$ and $R^7$ are methyl, or
$R^4$, $R^5$, $R^6$ and $R^7$ are hydrogen.

Especially preferred are ionic liquids IL2 in which the cation is an imidazolium cation of the formula (IIe) where
$R^4$ is hydrogen, methyl, ethyl, 1-propyl, 1-butyl, 1-pentyl, 1-hexyl, 1-octyl, 2-hydroxyethyl or 2-cyanoethyl and $R^5$, $R^6$ and $R^7$ are each independently hydrogen, methyl or ethyl.

Very particularly preferred imidazolium cations (IIe) include 1-methylimidazolium, 1-ethylimidazolium, 1-(1-butyl)imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazolium, 1-(1-butyl)-3-ethylimidazolium, 1-(1-hexyl)-3-methylimidazolium, 1-(1-hexyl)-3-ethylimidazolium, 1-(1-hexyl)-3-butylimidazolium, 1-(1-octyl)-3-methylimidazolium, 1-(1-octyl)-3-ethylimidazolium, 1-(1-octyl)-3-butylimidazolium, 1-(1-dodecyl)-3-methylimidazolium, 1-(1-dodecyl)-3-ethylimidazolium, 1-(1-dodecyl)-3-octylimidazolium, 1-(1-tetradecyl)-3-methylimidazolium, 1-(1-tetradecyl)-3-ethylimidazolium, 1-(1-tetradecyl)-3-butylimidazolium, 1-(1-tetradecyl)-3-octylimidazolium, 1-(1-hexadecyl)-3-methylimidazolium, 1-(1-hexadecyl)-3-ethylimidazolium, 1-(1-hexadecyl)-3-butylimidazolium, 1-(1-hexadecyl)-3-octylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium and 1,4,5-trimethyl-3-octylimidazolium.

Especially preferred are ionic liquids IL2 in which the cation is a pyrazolium cation of the formula (IIf) where
$R^4$ is hydrogen, methyl or ethyl and $R^5$, $R^6$ and $R^7$ are each independently hydrogen or methyl.

Especially preferred are ionic liquids IL2 in which the cation is a thiazolium cation of the formula (IIg) or (IIg') or an oxazolium cation of the formula (IIh) where $R^4$ is hydrogen, methyl, ethyl or phenyl and $R^5$, $R^6$ and $R^7$ are each independently hydrogen or methyl.

Especially preferred are ionic liquids IL2 in which the cation is a 1,2,4-triazolium cation of the formula (IIi), (IIi') or (IIi'') where $R^4$ and $R^5$ are each independently hydrogen, methyl, ethyl or phenyl and $R^6$ is hydrogen, methyl or phenyl.

In a preferred embodiment, the ionic liquid IL2 comprises, as cation, at least one, preferably exactly one, cation selected from the group consisting of pyridinium cations, pyridazinium cations, pyrimidinium cations, pyrazinium cations, imidazolium cations, pyrazolium cations, thiazolium cations and triazolium cations.

These cations are listed, for example, in WO 2005/113702. If necessary for a positive charge on the nitrogen atom or in the aromatic ring system, the nitrogen atoms are each substituted by an organic group having generally not more than 20 carbon atoms, preferably a hydrocarbyl group, especially a $C_1$-$C_{16}$ alkyl group, especially a $C_1$-$C_{10}$ alkyl group and more preferably a $C_1$-$C_4$ alkyl group.

Particularly preferred cations of IL2 are imidazolium cations, pyrimidinium cations and pyrazolium cations, which are understood to mean compounds having an imidazolium, pyrimidinium or pyrazolium ring system and optionally any desired substituents on the carbon and/or nitrogen atoms of the ring system.

Particularly preferred cations of IL2 are imidazolium cations, pyridinium cations and pyrazolium cations, which are understood to mean compounds having an imidazolium, pyridinium or pyrazolium ring system and optionally any desired substituents on the carbon and/or nitrogen atoms of the ring system.

Preferably, the ionic liquid IL2 comprises at least one, preferably exactly one, imidazolium cation as cation. Most preferably, the second ionic liquid IL2 comprises, as the sole cation, at least one, preferably exactly one, imidazolium cation.

In a particularly preferred embodiment, the ionic liquid IL2 is a compound of the formula (III) comprising an imidazolium cation

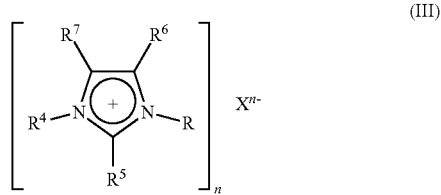

(III)

where

R, $R^4$, $R^5$, $R^6$ and $R^7$ are each as defined above;

X is an anion, and n is 1, 2 or 3.

Preferably, the $R^4$, $R^5$, $R^6$ and $R^7$ and $R^8$ radicals are each independently selected from hydrogen, $C_1$-$C_{12}$-alkyl, preferably $C_1$-$C_6$-alkyl, and halogen, especially selected from hydrogen, methyl, ethyl, 1-propyl, 1-butyl and chlorine.

The variable n is preferably 1.

Usable anions, especially as anion $X^{n-}$, are in principle any anions which, in conjunction with the cation, lead to an ionic liquid.

The anion, especially the anion $X^{n-}$, may be an organic or inorganic anion. Particularly preferred ionic liquids consist exclusively of the salt of an organic cation with one of the anions specified below.

The anion, especially the anion $X^{n-}$ according to the formulae (I) and (III) of the ionic liquids IL1 and IL2, is, for example, selected from:

the group of the halides and halogen compounds of the formulae:

$F^-$; $Cl^-$; $Br^-$; $I^-$; $BF_4^-$; $PF_6^-$; $AlCl_4^-$; $Al_2Cl_7^-$, $Al_3Cl_{10}^-$, $AlBr_4^-$; $CF_3SO_3^-$, $(CF_3SO_3)_2N^-$, $CF_3CO_2^-$, $CCl_3CO_2^-$, $CN^-$, $SCN^-$, $OCN^-$, $NO_2^-$, $NO_3^-$;

the group of the sulfates, sulfites and sulfonates of the formulae:

$SO_4^{2-}$, $HSO_4^-$, $SO_3^{2-}$, $HSO_3^-$, $R^aOSO_3^-$, $R^aSO_3^-$;

the group of the phosphates of the formulae:

$PO_4^{3-}$, $HPO_4^{2-}$, $H_2PO_4^-$, $R^aPO_4^{2-}$, $HR^aPO_4^-$, $R^aR^bPO_4^-$;

the group of the phosphonates and phosphinates of the formulae:

$RaHPO_3^-$, $R^aR^bPO_2^-$, $R^aR^bPO_3^-$;

the group of the carboxylates of the general formula:

$RaCOO^-$;

the group of the borates of the general formulae:

$BO_3^{3-}$, $HBO_3^{2-}$, $H_2BO_3^-$, $R^aR^bBO_3^-$, $R^aHBO_3^-$, $RaBO_3^{2-}$, $B(OR^a)(OR^b)(OR^c)(OR^d)^-$, $B(HSO_4)^-$, $B(R^aSO_4)^-$;

the group of the boronates of the general formulae:

$RaBO_2^{2-}$, $R^aR^bBO^-$;

the group of the carbonates and carbonic esters of the general formulae:

$HCO_3^-$, $CO_3^{2-}$, $R^aCO_3^-$;

the group of the carboximides, bis(sulfonyl)imides and sulfonylimides of the general formulae:

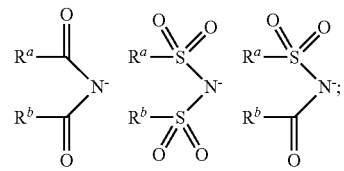

the group of the alkoxides and aryl oxides of the general formula:

$R^aO^-$;

where $R^a$, $R^b$, $R^c$ and $R^d$ in the aforementioned anions are each independently selected from:

hydrogen or $C_1$-$C_{12}$-alkyl and the cycloalkyl-, halogen-, hydroxyl-, amino-, carboxyl-, formyl-, —O—, —CO—, —CO—O— or —CO—N←substituted components thereof, for example methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl, dodecyl, methoxy, ethoxy, formyl, acetyl or $CF_3$.

More preferably, $R^a$, $R^b$, $R^c$ and $R^d$ in the aforementioned anions are each independently a hydrogen atom or an unsubstituted $C_1$-$C_{12}$-alkyl group, preferably $C_1$-$C_6$-alkyl group.

Particularly preferred anions, especially very particularly preferred anions $X^{n-}$, are:

chloride, bromide, hydrogensulfate, tetrachloroaluminate, thiocyanate, methylcarbonate, methylsulfate, ethylsulfate, methanesulfonate, formate, acetate, dimethylphosphate, diethylphosphate, p-tolylsulfonate, tetrafluoroborate, hexafluorophosphate, bis(trifluoromethylsulfonyl)imide and bis(methylsulfonyl)imide.

Very particularly preferred anions, especially very particularly preferred anions $X^{n-}$, are:

chloride, hydrogensulfate, methylsulfate, ethylsulfate, methanesulfonate, formate and acetate.

Especially preferred are ionic liquids IL2 comprising, as cation, at least one cation, preferably exactly one cation, selected from the group consisting of 1-methylimidazolium, 1-ethylimidazolium, 1-(1-butyl)imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazolium, 1-(1-butyl)-3-ethylimidazolium, 1-(1-hexyl)-3-methylimidazolium, 1-(1-hexyl)-3-ethylimidazolium, 1-(1-hexyl)-3-butylimidazolium, 1-(1-octyl)-3-methylimidazolium, 1-(1-octyl)-3-ethylimidazolium, 1-(1-octyl)-3-butylimidazolium, 1-(1-dodecyl)-3-methylimidazolium, 1-(1-dodecyl)-3-ethylimidazolium, 1-(1-dodecyl)-3-butylimidazolium, 1-(1-dodecyl)-3-octylimidazolium, 1-(1-tetradecyl-3-methylimidazolium, 1-(1-tetradecyl)-3-ethylimidazolium, 1-(1-tetradecyl)-3-butylimidazolium, 1-(1-tetradecyl-3-octylimidazolium, 1-(1-hexadecyl)-3-methylimidazolium, 1-(1-hexadecyl)-3-ethylimidazolium, 1-(1-hexadecyl)-3-butylimidazolium, 1-(1-hexadecyl)-3-octylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium, 1-(1-octyl)-2,3-dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium or 1,4,5-trimethyl-3-octylimidazolium;

and, as anion, at least one anion, preferably exactly one anion, selected from the group consisting of chloride, bromide, hydrogensulfate, tetrachloroaluminate, thiocyanate, methylsulfate, ethylsulfate, methanesulfonate, formate, acetate, dimethylphosphate, diethylphosphate, p-tolylsulfonate, tetrafluoroborate and hexafluorophosphate.

Particular preference is additionally given to ionic liquids IL2 selected from the group consisting of:

1,3-dimethylimidazolium methylsulfate, 1,3-dimethylimidazolium hydrogensulfate, 1,3-dimethylimidazolium dimethylphosphate, 1,3-dimethylimidazolium acetate, 1-ethyl-3-methylimidazolium methylsulfate, 1-ethyl-3-methylimidazolium ethylsulfate, 1-ethyl-3-methylimidazolium hydrogensulfate, 1-ethyl-3-methylimidazolium thiocyanate, 1-ethyl-3-methylimidazolium acetate, 1-ethyl-3-methylimidazolium methanesulfonate, 1-ethyl-3-methylimidazolium diethylphosphate, 1-(1-butyl)-3-methylimidazolium methylsulfate, 1-(1-butyl)-3-methylimidazolium hydrogensulfate, 1-(1-butyl)-3-methylimidazolium thiocyanate, 1-(1-butyl)-3-methylimidazolium acetate, 1-(1-butyl)-3-methylimidazolium methanesulfonate.

In a preferred embodiment, the composition C comprises as the first ionic liquid IL1 methyltri(1-butyl)ammonium methylsulfate (MTBS)

and as the second ionic liquid IL2 a compound selected from the group consisting of 1,3-dimethylimidazolium methylsulfate, 1,3-dimethylimidazolium hydrogensulfate, 1,3-dimethylimidazolium dimethylphosphate, 1,3-dimethylimidazolium acetate, 1-ethyl-3-methylimidazolium methylsulfate, 1-ethyl-3-methylimidazolium ethylsulfate, 1-ethyl-3-methylimidazolium hydrogensulfate, 1-ethyl-3-methylimidazolium thiocyanate, 1-ethyl-3-methylimidazolium acetate, 1-ethyl-3-methylimidazolium methanesulfonate, 1-ethyl-3-methylimidazolium diethylphosphate, 1-(1-butyl)-3-methylimidazolium methylsulfate, 1-(1-butyl)-3-methylimidazolium hydrogensulfate, 1-(1-butyl)-3-methylimidazolium thiocyanate, 1-(1-butyl)-3-methylimidazolium acetate and 1-(1-butyl)-3-methylimidazolium methanesulfonate, preferably selected from 1-ethyl-3-methylimidazolium methylsulfate, 1-ethyl-3-methylimidazolium ethylsulfate, 1-ethyl-3-methylimidazolium hydrogensulfate, 1-ethyl-3-methylimidazolium thiocyanate, 1-ethyl-3-methylimidazolium acetate, 1-ethyl-3-methylimidazolium methanesulfonate and 1-ethyl-3-methylimidazolium diethylphosphate.

Further Constituents of Composition C

The composition C of the invention and the composition C used in the process of the invention may comprise further constituents in addition to the ionic liquids IL1 and IL2.

Possible examples of these include additives with which a desired viscosity and/or a desired melting point is established. These include, for example, solvents, especially water and/or organic solvents miscible with the ionic liquid.

In a preferred embodiment, the composition C comprises
 50% to 95% by weight, preferably 60% to 90% by weight and more preferably 60% to
 80% by weight, based on the overall composition C, of the at least one ionic liquid IL1;
 5% to 50% by weight, preferably 5 to 40% by weight, preferably 10% to 40% by weight, also preferably 5 to 20% by weight and more preferably 10% to 20% by weight, based on the overall composition C, of the at least one ionic liquid IL2;
 0% to 45% by weight, preferably 0% to 30% by weight, more preferably 1% to 30% by weight and most preferably 5% to 20% by weight, based on the overall composition C, of at least one solvent S.

In a preferred embodiment, the composition C consists of the abovementioned components, i.e. the abovementioned components add up to 100% by weight.

Preferably, the composition C is a solution; more particularly, the components of composition C are homogeneously miscible with one another or the components of composition C are in homogeneously distributed form. More particularly, the composition C is a solution having molecular dispersion.

The composition C may especially comprise water or an organic solvent miscible with water and the ionic liquids IL1 and IL2 or a mixture thereof as solvent S.

The solvent S is especially to have the following properties:

The viscosity of the ternary mixture of solvent S, ionic liquid IL1 and ionic liquid IL2 is to be distinctly lowered compared to the mixture of the ionic liquids IL1 and IL2 and the ionic liquids IL1 and IL2 alone; more particularly, the viscosity of the ternary mixture of solvent S, ionic liquid IL1 and ionic liquid IL2 is to be in the range from 20 to 200 mPas, preferably in the range from 30 to 100 mPas, more preferably in the range from 30 to 70 mPas.

The melting point of the ternary mixture of solvent S, ionic liquid IL1 and ionic liquid IL2 is to be lowered compared to the mixture of the ionic liquids IL1 and IL2 and the ionic liquids IL1 and IL2 alone; more particularly, the melting point of the ternary mixture is to be below room temperature (25° C.), preferably below 10° C., more preferably below 0° C.

It has been found that, surprisingly, the use of a selected solvent S can distinctly lower the viscosity and the melting point of the compositions C.

Preferably, the composition C comprises at least one solvent S selected from water, propylene carbonate, polyethylene glycols, mono-, di- or triesters of glycol and $C_1$-$C_6$ carboxylic acids, especially diacetin (glyceryl diacetate) and triacetin (glyceryl triacetate), glycols, especially ethylene glycol, diethylene glycol, triethylene glycol and tetraethylene glycol. Preference is given to polyethylene glycols having a molecular weight in the range of 200-4000 g/mol, preferably 200-1000 g/mol, more preferably 200-600 g/mol.

More preferably, the composition C comprises 1% to 30% by weight, preferably 5% to 20% by weight and more preferably 7% to 15% by weight, based on the overall composition C, of at least one solvent S selected from propylene carbonate, polyethylene glycol, especially PEG 200, triacetin and water.

In a preferred embodiment, the composition C comprises

49% to 94% by weight, preferably 55% to 85% by weight and more preferably 60% to
80% by weight, based on the overall composition C, of the at least one ionic liquid IL1;
5% to 50% by weight, preferably 10% to 40% by weight and more preferably 10% to
20% by weight, based on the overall composition C, of the at least one ionic liquid IL2;
1% to 30% by weight, preferably 5% to 20% by weight, based on the overall composition C, of at least one solvent S selected from the group consisting of water, propylene carbonate, polyethylene glycols, mono-, di- or triesters of glycol and $C_1$-$C_6$ carboxylic acids, and glycols, preferably selected from the group consisting of water, propylene carbonate, polyethylene glycols, diacetin (glyceryl diacetate), triacetin (glyceryl triacetate), ethylene glycol, diethylene glycol, triethylene glycol and tetraethylene glycol.

In a preferred embodiment, the composition C comprises exclusively propylene carbonate as solvent S. It is additionally possible that the composition comprises a mixture of propylene carbonate and water as solvent S, in which case the proportion of propylene carbonate, based on the overall solvent S, is at least 30% by weight, preferably at least 50% by weight, more preferably at least 90% by weight.

The composition consists preferably to an extent of more than 10% by weight, especially to an extent of more than 30% by weight, more preferably to an extent of more than 50% by weight and most preferably to an extent of more than 80% by weight of the ionic liquids IL1 and IL2. In a particularly preferred embodiment, it consists to an extent of more than 90% by weight and especially to an extent of more than 95% by weight of the ionic liquids IL1 and IL2. In a further embodiment, the composition consists exclusively of the ionic liquids IL1 and IL2.

Preferably, the composition comprises the at least two different ionic liquids IL1 and IL2 in a mass ratio of IL1 to IL2 in the range from 1 to 20, preferably 1.5 to 10, more preferably from 2 to 6, especially preferably from 3 to 5, for example 4.

Preferably, the composition comprises the at least two different ionic liquids IL1 and IL2 in a mass ratio of IL1 to IL2 in the range from 1 to 20, preferably 3 to 18, more preferably from 5 to 20, especially preferably from 7 to 15, for example 7.5 or 15.

The composition C comprising or consisting of the ionic liquids IL1 and IL2 is preferably liquid over the entire temperature range from 0 to 100° C., especially from 20 to 100° C. (at standard pressure, 1 bar).

The Process

An essential element in the process of the invention is the pretreatment according to the claims of the plastics. The various process steps for chemical and electrolytic coating with metal and further measures for performance, preparation and finishing that are necessary or advisable for the purpose are described in a wide variety of different embodiments in the prior art, for example in DE-A 100 54 544, Schlesinger et al. "Modern Electroplating" chapter 18, pages 450-457 (5th edition, 2010, John Wiley & Sons Inc., ISBN 978-0-470-16778-6) or Kanani "Galvanotechnik" [Electroplating Technology] (Carl Hanser Verlag, 2000, ISBN 3-446-21024-5).

Even prior to the pretreatment of the invention (step a)), cleaning and degreasing of the plastic surfaces to be coated may be advisable. Cleaning and degreasing of this kind can be conducted with standard cleaning compositions or surfactants.

The pretreatment of the invention replaces the etching with aggressive chemicals such as chromosulfuric acid (chromium trioxide in sulfuric acid) that has been customary to date.

Step a)

The process of the invention comprises, in step a), the pretreatment of the plastic with a composition C (etch composition) comprising at least two different ionic liquids IL1 and IL2, the first ionic liquid IL1 comprising, as cation, at least one (preferably exactly one) alkylammonium cation and the second ionic liquid IL2 comprising, as cation, at least one (preferably exactly one) aromatic heterocycle having a delocalized cationic charge and comprising at least one nitrogen atom.

Preferably, the inventive composition C described below (etch composition) is used in the process according to the invention.

A preferred embodiment relates to the process of the invention described, wherein the pretreatment of the plastic with the composition C in step a) is effected at a temperature of 30 to 120° C., more preferably of 50 to 120° C., especially preferably of 50 to 65° C. Preferably, the composition C has the above temperature for this purpose. Prior separate heating of the plastic part to be coated is often unnecessary. In a preferred embodiment, the to the plastic acts about ABS and the pretreatment of the plastic with the composition C in step a) is effected at a temperature of 30 to 80° C.

In a preferred embodiment, the plastic molding to be coated is dipped into the composition C, where the composition C preferably has the above temperature. In this case, the composition C can be agitated for better mass transfer, which can be effected by stirring, pumping, blowing air in, etc. Alternatively, the plastic molding itself can also be agitated in the composition C by means of specific devices known in electroplating. The person skilled in the art is aware of suitable methods for the purpose.

The required amount of composition C is adjusted in such a way that the plastic molding is wetted to the desired degree. The plastic molding can be immersed completely or else partially.

Preferably, the duration of contact of the composition C with the plastic or the plastic surface is 1-60 minutes (min), especially 1-30 min, more preferably 1-15 min.

The viscosity of the composition C (etch composition) is preferably in the range from 20 to 200 mPas, preferably in the range from 30 to 100 mPas and more preferably in the range from 30 to 70 mPas (in each case by dynamic means at 60° C.).

After the contact, the composition can preferably be removed from the pretreated article by rinsing it off with water or an organic solvent. Preferably, the process of the invention comprises a rinse step a1) wherein the plastic molding from step a) is treated with an aqueous rinse solution RS while applying ultrasound. This treatment can especially remove the adhering composition C, but also partly dissolved plastic particles, from the surface of the plastic molding.

In a preferred embodiment, the treating of the plastic molding with the aqueous rinse solution RS while applying ultrasound is effected after step a) by dipping the plastic molding from step a) into an ultrasound bath comprising the aqueous rinse solution RS for a period of 1 to 30 min, preferably 2 to 20 min and more preferably 5 to 15 min. Preferably an sufficient rinsing might be obtained after 1 to 2 min, in particular at about 90 sec. Preferably, the rinsing is conducted at a temperature in the range from 10 to 80° C., preferably 20 to 70° C., more preferably 40 to 60° C.

Preferably the treating of the plastic, or of the plastic surface, with the aqueous rinse solution RS while applying ultrasound is effected by dipping the plastic, or the plastic surface, into an ultrasound bath comprising the aqueous rinse solution RS at a power in the range from 40 to 60 watts/L, over a period of 1 to 30 min and at a temperature of 40 to 60°, and wherein the aqueous rinse solution RS comprises at least 85% by weight of water, preferably at least 95% by weight.

The aqueous rinse solution RS preferably comprises water or a mixture of water and one or more water-miscible organic solvents, where the proportion of water is generally at least 85% by weight, preferably at least 95% by weight and more preferably at least 98% by weight, based in each case on the overall rinse solution. Organic solvents used may be known polar water-miscible solvents such as alcohols or dimethyl sulfoxide (DMSO). Organic solvents used may especially be water-miscible alcohols such as methanol, ethanol or propanol. In a preferred embodiment, the rinse solution RS consists exclusively of water.

In one embodiment, the composition C can be recovered (recycled), optionally cleaned and reused. The recycling of the composition can especially be effected, for example, by a precipitation of the dissolved plastic by means of water or an organic solvent and subsequent removal of the dissolved plastic by a filtration. The medium/media utilized for precipitation can subsequently be recovered by distillation. It is also possible to remove volatile constituents of the dissolved plastic from the composition by direct distillation. In this way, it is possible to obtain a purified and reusable composition.

Step b)

The process of the invention comprises, in step b), the treating of the plastic from step a) with an activator composition A comprising at least one ionogenic and/or colloidal activator, especially at least one palladium component P, preferably at least one colloidal palladium component P.

Typically, step b) comprises, especially in combination with step c), the applying of metal nuclei, preferably of metal nuclei of palladium, silver or gold, more preferably of palladium. Step b) is typically referred to as activation. Preferably, the manner of activation and the first metal coating in step d) are matched to one another.

Known methods for activation are, for example, conventional colloidal activation (application of palladium/tin colloids), ionogenic activation (application of palladium cations), direct metallization or processes known by the Udique Plato®, Enplate MID select or LDS Process names.

For example, activation with ionogenic systems can be accomplished by first treating the plastic surface with tin(II) ions, generally with formation of firmly adhering gels of tin oxide hydrate on rinsing with water after the treatment with the tin(II) ions. In the subsequent treatment with a palladium salt solution, palladium nuclei are normally formed on the plastic surface through reduction with the tin(II) species, and these typically serve as catalyst/metal nucleus for the later chemical metallization (step d)).

For activation with colloidal systems, it is possible to use noble metal colloid compositions, especially colloids of the gold group (transition group I) and platinum group of the Periodic Table. Preference is given to using colloidal solutions of palladium, silver or gold, especially preferably colloidal solutions of palladium. In the colloidal solution, the metal nuclei, for example the palladium nuclei, are typically surrounded by the protective colloid shell. It is possible with preference to use palladium colloid solutions which form through reaction of palladium chloride with tin(II) chloride in the presence of excess hydrochloric acid.

The concentration of the at least one ionogenic and/or colloidal activator P in the activator composition A is typically 20 to 150 mg/L.

Typical palladium-containing activator systems and further details of the activation step are described in Annual Book of ASTM Standard, Vol. 02.05 "Metallic and Inorganic Coatings; Metal Powders, Sintered P/M Structural Parts", Standard Practice for Preparation of Plastic Materials for Electroplating, 1995, pages 446-450.

Typically, the activator P used may be a standard commercially available palladium activator, for example "Activator U" from HSO or "Surtec 961 Pd" from Surtec.

Step c)

The process of the invention comprises, in step c), the treating of the plastic from step b) with an accelerator composition B comprising an acid and/or a reducing agent.

The treatment of the plastic, or of the plastic surface, with the accelerator composition B especially frees the metal nuclei adsorbed on the surface (especially in the depressions), especially palladium, silver or gold nuclei, of the protective colloid shell and/or reduces the absorbed metal salts to the metal. The treatment of the plastic surface with the accelerator composition B typically gives rise to metal nuclei on the plastic surface, preferably metal nuclei of palladium, silver or gold, more preferably of palladium. These metal nuclei typically serve as the starting point (catalyst) for the subsequent chemical metal deposition in step d).

According to the invention, the accelerator composition B) comprises at least one reducing agent and/or an acid which is particularly suitable for removing the protective metal colloid shell and/or for reducing metal salts present at the surface to the metal. Preferably, the at least one reducing agent is selected from alkali metal, ammonium or alkaline earth metal fluoroborate, for example sodium tetrafluoroborate (NaBF$_4$), peroxides, sulfites, hydrogensulfites, hydrazine and salts thereof, hydroxylamine and salts thereof. Preferably, the at least one acid is selected from hydrochloric acid, methanesulfonic acid, citric acid, ascorbic acid, tartaric acid, tetrafluoroboric acid (HBF$_4$).

The pH of the accelerator composition B may especially be set within a range from 0 to 7, preferably from 1 to 2.

The concentration of the acid and/or the reducing agent in the accelerator composition B is typically 0.4 to 0.5 N; the concentration is especially 0.45 N (pH 1.5).

Typical accelerator compositions and further details of the acceleration step are described in Annual Book of ASTM Standard, Vol. 02.05 "Metallic and Inorganic Coatings; Metal Powders, Sintered P/M Structural Parts", Standard Practice for Preparation of Plastic Materials for Electroplating, 1995, pages 446-450.

Typically, the accelerator composition B used may be a standard commercially available accelerator, for example "HSO Accelerator" from HSO or "Surtec 961 A" from Surtec.

Step d)

A further constituent of the process of the invention is the application of what is called a first metal coating, which is typically effected by electroless means (chemical metal deposition). In general, the first layer applied by electroless means (seed layer) is a layer of nickel, copper, chromium or alloys thereof. Preference is given to one or more layers of nickel and/or copper.

The process of the invention comprises, in step d), the chemical deposition of a metal layer, preferably of a metal layer consisting essentially of nickel, by treating the plastic, or the plastic surface, from step c) with a coating composition M1 comprising at least one metal salt, preferably at least one nickel(II) salt, and at least one reducing agent, preferably an in situ reducing agent. Preferably, the coating composition M1 additionally comprises a complexing agent and/or buffer.

Further preferably, step d) comprises the chemical deposition of a metal layer consisting essentially of nickel and/or copper, by treating the plastic, or the plastic surface, from step c) with a coating composition M1 comprising at least one nickel(II) salt and/or one copper(II) salt, and at least one reducing agent, preferably an in situ reducing agent.

Typical coating compositions M1 are described, for example, in Schlesinger et al. "Modern Electroplating" (5th edition, 2010, John Wiley & Sons Inc., ISBN 978-0-470-16778-6) on page 451.

Preferably, the plastic or the plastic surface from step d) is coated with a metal layer consisting of nickel, copper, chromium or alloys thereof, more preferably of nickel, copper or an alloy thereof, especially preferably of nickel.

Preferably, the metal salt is selected from nickel, copper and chromium salts, for example halides or sulfates. Preferably, the coating composition M1 comprises at least one nickel salt, for example nickel sulfate.

The concentration of the at least one metal salt, especially of the at least one nickel salt, in the coating composition M1 is typically in the range from 15 to 35 g/L.

The pH of the coating composition M1 is typically in the range from 4 to 11. In principle, according to the type of buffer system, a distinction may be made between acidic or alkaline compositions. In the case of the acidic methods, the pH of the coating composition M1 is typically in the range from 4 to 7, preferably 4 to 6. In the case of alkaline methods, the pH is typically in the range from greater than 7 to 11, preferably 8 to 10. Preferably, the pH is set to about 9.

Preferably, the coating composition M1 comprises at least one reducing agent, especially an in situ reducing agent, selected from the group consisting of hydrogen peroxide, peroxides, hypophosphites, hypophosphates (e.g. sodium hypophosphate), borane and borane derivatives (e.g. aminoborane such as dimethylaminoborane, sodium borohydride) and hydrazine.

The concentration of reducing agent in the coating composition M1 is typically 15 to 30 g/L.

Typically, the coating composition M1 for chemical nickel baths may comprise typical further components and additives known to those skilled in the art, as described, for example, in chapter 18.3 in Schlesinger et al. "Modern Electroplating" (5th edition, 2010, John Wiley & Sons Inc., ISBN 978-0-470-16778-6). Typically, the coating composition M1 may comprise complexing agents for the nickel ions, preferably carboxylic acids and hydroxycarboxylic acids, for example succinic acid, citric acid, malic acid, tartaric acid and/or lactic acid, and acetic acid, propionic acid, maleic acid, fumaric acid and/or itaconic acid. Buffers used may typically be citrates, acetates, phosphates and ammonium salts.

Typically, the coating composition M1 used may be a standard commercially available coating bath for electroless nickel deposition, for example "Electroless Nickel 601 KB" from HSO or "Surtec 3/11 D" from Surtec.

The temperature of the coating composition M1 during the performance of step d) in the case of acidic processes is typically 60 to 100° C. and in the case of alkaline processes typically in the range from 25 to 50° C.

After step d), the plastics (plastic surfaces) may be rinsed, preferably rinsed with water, and/or dried.

Step e)

Step e) of the process of the invention, finally, comprises the electrochemical deposition of metal layers, preferably of one or more layers consisting essentially of nickel, copper and/or chromium. Step e) may especially comprise one, two or more than two different electrochemical coatings.

By the process of the invention, it is possible to improve the adhesion of the metal layers, especially of the outermost chromium layer, on the plastic surface, for example made from ABS. It is often the case that, for many plastics, metallization is actually made possible at all. The achieved adhesion of the metal layers is very good, even in the event of mechanical stress or high temperatures.

The process of the invention comprises, in step e), the electrochemical coating of the plastic, or the plastic surface, from step d) with at least one metallic layer, by treating the plastic, or the plastic surface, with at least one further coating composition M' comprising at least one metal compound.

Preferably, step e) comprises the electrochemical coating of the plastic with at least one metallic layer consisting essentially of copper. For this purpose, the surface is contacted with a coating composition M2 comprising at least one copper compound, preferably at least one copper(II) salt, and subjected to an electrochemical electrolysis.

Preferably, step e) comprises the electrochemical coating of the plastic with at least one metallic layer consisting essentially of chromium. For this purpose, the surface is typically contacted with a coating composition M3 comprising at least one chromium compound, preferably selected from chromic acid, chromic acid derivatives, chromium(VI) salts and chromium(III) salts, and subjected to an electrochemical electrolysis.

Preferably, the invention relates to a process as described above, wherein the electrochemical coating in step e) comprises the following steps:
- e1) electrochemically coating the plastic, or the plastic surface, from step d) with a layer consisting essentially of copper and/or nickel, by treating the plastic, or the plastic surface, from step d) with a coating composition M2 comprising at least one copper compound, especially comprising at least one Cu(II) salt, and/or at least one nickel compound, especially comprising at least one Ni(II) salt; and
- e2) electrochemically coating the plastic, or the plastic surface, from step e1) with a layer consisting essentially of chromium, by treating the plastic, or the plastic surface, from step e1) with a coating composition M3 comprising at least one chromium compound, especially comprising at least one chromium compound selected from chromic acid, chromic acid derivatives, chromium(VI) salts and chromium(III) salts.

Preferably, in step e1), the plastic from step d) is electrochemically coated with a layer consisting essentially of copper, by treating the plastic from step d) with a coating composition M2 comprising at least one copper compound, especially comprising at least one Cu(II) salt.

Further preferably, in step e), the plastic from step d) is electrochemically coated with one or more layers consisting essentially of copper and one or more layers consisting essentially of chromium. Preferred coating sequences (steps d), e1) and e2)) may be as follows: Ni (chem)→SB—Ni→B—Ni→Cr or Ni (chem)→Cu→SB—Ni→B—Ni→Cr or Cu (chem)→SB—Ni→B—Ni→Cr or Cu (chem)→Cu→SB—Ni→B—Ni→Cr, where SB—Ni is a semi-bright nickel layer and B—Ni is a bright nickel layer.

Typically, the coating composition M2 comprises at least one copper salt, preferably at least one copper(II) salt, for example copper sulfate ($CuSO_4$). Typically, the coating composition M2 comprises at least one copper salt, water and an acid, for example sulfuric acid, alkylsulfonic acids such as methane sulfonic acid. Typically, the coating composition M2 may comprise, as a further additive, an additive customary for this application, for example a surfactant, a brightener, suppressors or levelers.

Typically, the coating composition M2 used may be a standard commercially available copper electrolysis bath, for example "Copper HD 500" from HSO or "Surtec 867" from Surtec.

Typically, the coating composition M3 comprises at least one chromium salt and/or chromic acid, preferably at least one chromium(III) salt and/or one chromium(VI) salt, more preferably chromic acid $H_2CrO_4$ and/or chromium trioxide $CrO_3$. Typically, the coating composition M3 comprises at least one chromium compound, especially chromic acid, water and an acid as catalyst, for example at least one acid selected from sulfuric acid ($H_2SO_4$), hydrofluoric acid (HF), hexafluorosilicic acid ($H_2SiF_6$), alkylsulfonic acids such as methane sulfonic acid. Typically, the coating composition M3 may comprise, as further additive, a surfactant known for this application.

The process of the invention may comprise one or more rinse steps before or after the steps a) to e) described. Preferably, the composition C (etch composition) is rinsed off the plastic or the plastic surface prior to step b), especially with a suitable solvent, especially water. Suitable rinse solutions are described above.

Preferably, the present invention relates to a process for coating plastic with metals as described above, comprising steps a) to e), preferably steps a) to d) and e1) and e2), with treatment of the plastic with a rinse solution RS after step a). The rinse solution R is preferably water. The rinse solution may optionally comprise the additions known to those skilled in the art, for example surfactants.

Inventive Composition C

The present invention additionally relates to a composition C for pretreatment (etching) of plastic surfaces, especially in the context of a process for coating plastic with metals, comprising at least two different ionic liquids IL1 and IL2, the first ionic liquid IL1 comprising, as cation, at least one alkylammonium cation and the second ionic liquid IL2 comprising, as cation, at least one aromatic heterocycle having a delocalized cationic charge and comprising at least one nitrogen atom.

The preferred embodiments of the composition C and components thereof are described above in connection with the process of the invention and apply correspondingly.

In a preferred embodiment, the weight ratio of the ionic liquid IL1 to the ionic liquid IL2 is in the range from 1 to 20, preferably 2 to 6, more preferably 3 to 5.

In a preferred embodiment, the composition C comprises
- 49% to 94% by weight, preferably 55% to 85% by weight and more preferably 60% to
- 80% by weight, based on the overall composition C, of the at least one ionic liquid IL1;
- 5% to 50% by weight, preferably 10% to 40% by weight and more preferably 10% to
- 20% by weight, based on the overall composition C, of the at least one ionic liquid IL2;
- 1% to 30% by weight, preferably 5% to 20% by weight, based on the overall composition C, of at least one solvent S selected from the group consisting of water, propylene carbonate, polyethylene glycols, especially polyethylene glycols having a molecular weight in the range of 200-4000 g/mol, mono-, di- or triesters of glycol and $C_1$-$C_6$ carboxylic acids, glycols, preferably selected from the group consisting of water, propylene carbonate, polyethylene glycols (especially polyethylene glycols having a molecular weight in the range of 200-4000 g/mol), diacetin, triacetin, ethylene glycol, diethylene glycol, triethylene glycol and tetraethylene glycol, more preferably selected from water and propylene carbonate.

In another preferred embodiment, the composition C comprises
- 49% to 94% by weight, preferably 55% to 85% by weight and more preferably 60% to
- 80% by weight, based on the overall composition C, of the at least one ionic liquid IL1;
- 5% to 50% by weight, preferably 5% to 30% by weight and more preferably 5% to 20% by weight, based on the overall composition C, of the at least one ionic liquid IL2;
- 1% to 30% by weight, preferably 10% to 30% by weight, based on the overall composition C, of at least one solvent S as described above.

In a preferred embodiment, the composition C consists of the abovementioned components, i.e. the abovementioned components add up to 100% by weight. Preferably, the composition is a solution, meaning that the components are especially miscible homogeneously with one another. Preferably, the components are in molecular dispersion in the composition C (true solution).

The invention additionally relates to the use of the composition C of the invention as described above for pretreatment (etching) of a plastic surface in the course of a process for coating plastic with metals.

The embodiments described above apply correspondingly to the inventive use.

The invention is further described by the examples which follow.

EXAMPLES

Example 1

1.1 General Test Method for Examination of Etching Action a) Etching of ABS

A plaque of dimensions 60×30×2 mm made from ABS (Terluran® GP 35 from Styrolution), for preliminary cleaning, is dipped into 60 mL of ethanol at room temperature for 2 minutes. Subsequently, the plaque is dipped into 2 L of stirred ionic liquid at 50° C. for 5 minutes. After etching has ended, the substrate is rinsed with water, cleaned in an ultrasound bath at 50° C. in water for 10 min and, to remove the last residues of the etch solution, rinsed under flowing water (distilled water) at room temperature for 1 minute. The etching action of the etch solutions (compositions C) is checked by means of SEM analysis and shows new structuring of the surface.

The ionic liquids used were the following compositions:

| | |
|---|---|
| C1 | methyltri(1-butyl)ammonium methylsulfate (MTBS) |
| C2 | mixture of methyltri(1-butyl)ammonium methylsulfate (MTBS) and 1-ethyl-3-methylimidazolium ethylsulfate (EMIM-EtSO$_4$) in a ratio of 90:10 |

Figure 2:
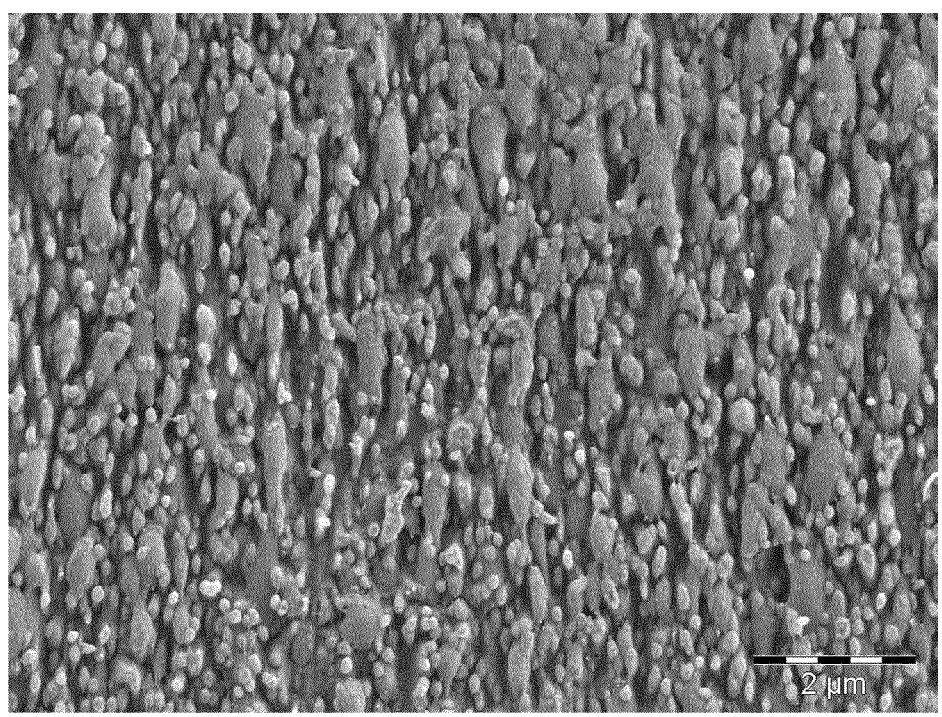
FIG. 2 shows the ABS surface after the treatment with composition C2.

FIG. 1 shows the ABS surface prior to etching. FIG. 2 shows the ABS surface after the treatment with composition C2.

Figure 3:
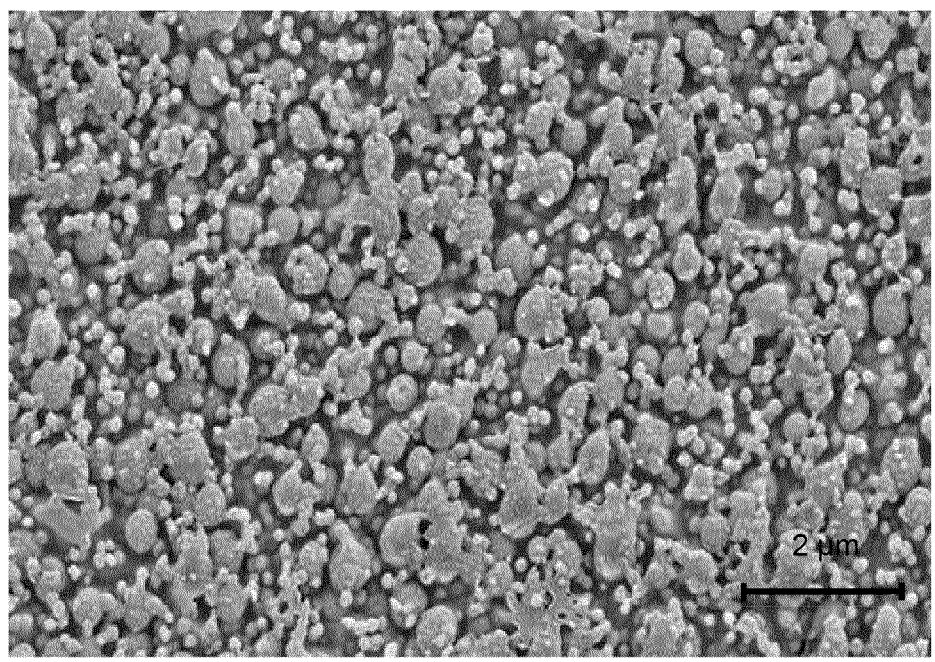
FIG. 3 shows the ABS surface after the treatment with composition C2.

The above-described etching process was repeated on plaques of the ABS polymer Novodur®P2MC from Styrolution. FIG. 3 shows the ABS surface after the treatment with composition C2.

b) Metallization

After the etching and rinsing, the test plaques were metallized. For this purpose, the following treatment steps were conducted:

Treatment with activator composition A→treatment with accelerator composition B→chemical electroless deposition of nickel using the coating composition M1→electrodeposition of copper using the coating composition M'.

The following products were used:

| | |
|---|---|
| Activator composition A | "Activator U" from HSO or "Surtec 961 Pd" from Surtec |
| Accelerator composition B | "HSO Accelerator" from HSO or "Surtec 961 A" from Surtec |
| Coating composition M1 | "Electroless Nickel 601KB" from HSO or "Surtec 3/11D" from Surtec |
| Coating composition M' | "Copper HD 500" from HSO or "Surtec 867" from Surtec |

The quality of the metal coating is determined with the aid of what is called the cross-cut test according to ISO 2409: 2007.

It was found that the metal layers which were obtained using the composition C1 (with pure MTBS) have inadequate adhesion. The metal layers which were obtained using the composition C2 (MTBS/EMIN) exhibit good adhesion.

Example 2—Addition of a Solvent a) Viscosity

Various mixtures of the ionic liquids in various organic solvents were prepared by intimately mixing the components. The mixtures comprised one or more of the following components:

| | |
|---|---|
| MTBS | methyltri(1-butyl)ammonium methylsulfate |
| EMIM-EtSO$_4$ | 1-ethyl-3-methylimidazolium ethylsulfate |
| PEG 200 | polyethylene glycol (molecular weight 200) |
| PC | propylene carbonate (4-methyl-1,3-dioxolan-2-one) |

The dynamic viscosity of the mixtures (compositions C) was measured by means of rotary viscometry to DIN 53019 at 60° C. or at 23° C. as indicated in Table 1. The compositions of the mixtures and the viscosities measured are compiled in table 1 below.

TABLE 1

Mixtures of IL and IL/solvent

| Experiment no. | Components | Weight ratio | Viscosity [mPa*s] |
|---|---|---|---|
| 1 | MTBS | | solid |
| 2 | MTBS/EMIM-EtSO | 85:15 | 260 (60° C.) |
| 3 | MTBS/PEG 200 | 80:20 | 80 (60° C.) |
| 4 | MTBS/EMIM-EtSO/PC | 80:10:10 | 233 (60° C.) |
| 5 | MTBS/EMIM-EtSO/PC | 75:10:15 | 312 (23° C.) |
| 6 | MTBS/EMIM-EtSO/PC | 75:5:20 | 185 (23° C.) |

Through the addition of a second selected ionic liquid IL2, for example EMIM, it is possible to distinctly lower the viscosity of MTBS. It was additionally found that the viscosity of the mixture of two ionic liquids IL1 and IL2 used with preference can be distinctly lowered by the addition of a suitable solvent, for example propylene carbonate.

Although the mixture according to experiment no. 3 has the lowest viscosity, it exhibits shortcomings in relation to the stability of the treated plastics.

b) Entrainment Losses

The entrainment of the etch compositions (etch solutions) owing to adhesion on the plastic surface was studied as described hereinafter:

An ABS plastic specimen (plastic plaque of dimensions 60×30×2 mm) was dipped vertically into the various etch compositions Z according to table 2 and etched under the conditions specified. Thereafter, the plaque was removed and allowed to drip for 5 seconds. The amount of adhering etch composition is determined by gravimetric means and reported in g per m$^2$ of plastic surface area.

TABLE 2

Entrainment owing to adhesion of the etch compositions C

| Experiment no. | Components C | Weight ratio | Etch conditions | Entrainment after dripping [g/m2] |
|---|---|---|---|---|
| 6 | MTBS/EMIM-EtSO4 | 90:10 | 60° C., 10 min | 354 |
| 7 | MTBS/EMIM-EtSO/PC | 80:10:10 | 50° C., 7 min | 187 |

The etch conditions have to be selected differently, since a different etch finish on the surface would otherwise arise given the different composition of the etchant.

A lower viscosity has a distinct influence on the unfavorable entrainment of etch composition and the associated loss of ionic liquid. The viscosity can be regarded as an important factor for the adhesion of the etch solutions on the plastic surface. Lowering the viscosity of the etchant can significantly reduce the entrainment of etch composition C.

The results of the crosscut test after the metallization described in 1 b showed that the addition of the solvent, for example propylene carbonate, did not have any adverse effect on the bond strength of the subsequent coatings.

The invention claimed is:

1. A process for coating plastic with one or more metals, comprising:
   a) pretreating the plastic with a composition C comprising: a first ionic liquid IL1 comprising, as cation, at least one alkylammonium cation; and a second ionic liquid IL2 comprising, as cation, at least one aromatic heterocycle having a delocalized cationic charge and comprising at least one nitrogen atom, the first ionic liquid IL1 and the second ionic liquid IL2 being different from each other;
   b) treating the plastic from a) with an activator composition A comprising at least one ionogenic and/or colloidal activator;
   c) treating the plastic from b) with an accelerator composition B comprising an acid and/or a reducing agent;
   d) chemically depositing a metal layer, by treating the plastic from c) with a coating composition M1 comprising at least one metal salt and at least one reducing agent; and
   e) electrochemically coating the plastic from d) with at least one further metal layer, by electrochemically treating the plastic from d) with at least one coating composition M' comprising at least one metal compound,
   wherein the alkylammonium cation included in the first ionic liquid IL1 is represented by formula (I),

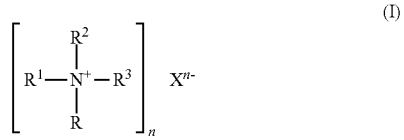

wherein
R is an unbranched and unsubstituted $C_1$-$C_{18}$-alkyl, $CH_3$—$(CH_2CH_2O)_p$—$CH_2CH_2$— or $CH_3CH_2O$—$(CH_2CH_2O)_p$—$CH_2CH_2$— with p=0 to 3;
$R^1$, $R^2$ and $R^3$ are each independently:
a hydrogen atom, unsubstituted $C_1$-$C_{18}$-alkyl, 2-hydroxyethyl, 2-cyanoethyl, 2-(methoxycarbonyl)ethyl, 2-(ethoxycarbonyl)ethyl, 2-(n-butoxycarbonyl)ethyl, chlorine, $CH_3O$—$(CH_2CH_2O)_p$—$CH_2CH_2$— or $CH_3CH_2O$—$(CH_2CH_2O)_p$—$CH_2CH_2$— with p=0 to 3, or two adjacent $R^1$, $R^2$ and $R^3$ radicals together with the nitrogen atom in formula (I) are a saturated unsubstituted five- to seven-membered ring; and
n is 1, 2 or 3,
wherein the at least one aromatic heterocycle having a delocalized cationic charge and comprising at least one nitrogen atom in the second ionic liquid IL2, comprises at least one cation selected from the group consisting of pyridinium cations, pyridazinium cations, pyrimidinium cations, pyrazinium cations, imidazolium cations, pyrazolium cations, thiazolium cations and triazolium cations, and
wherein a mass ratio of the first ionic liquid IL1 to the second ionic liquid IL2 is in the range from 3 to 18.

2. The process according to claim 1, wherein the ionic liquids IL1 and IL2 are each a salt which is liquid at 100° C., 1 bar.

3. The process according to claim 1, wherein the at least one aromatic heterocycle having a delocalized cationic charge and comprising at least one nitrogen atom in the second ionic liquid IL2, comprises exactly one imidazolium cation.

4. The process according to claim 1, wherein the composition C comprises
   as the first ionic liquid IL1 methyltri(1-butyl)ammonium methylsulfate (MTBS)
   and as the second ionic liquid IL2 a compound selected from the group consisting of 1-ethyl-3-methylimidazolium methylsulfate, 1-ethyl-3-methylimidazolium ethylsulfate, 1-ethyl-3-methylimidazolium hydrogensulfate, 1-ethyl-3-methylimidazolium thiocyanate, 1-ethyl-3-methylimidazolium acetate, 1-ethyl-3-methylimidazolium methanesulfonate and 1-ethyl-3-methylimidazolium diethylphosphate.

5. The process according to claim 1, wherein the composition C comprises
   50% to 95% by weight, based on the overall composition C, of the first ionic liquid IL1;
   5% to 50% by weight, based on the overall composition C, of the second ionic liquid IL2; and
   0% to 45% by weight, based on the overall composition C, of at least one solvent S.

6. The process according to claim 1, wherein the composition C comprises
   49% to 94% by weight, based on the overall composition C, of the first ionic liquid IL1;
   5% to 50% by weight, based on the overall composition C, of the second ionic liquid IL2; and
   1% to 30% by weight, based on the overall composition C, of at least one solvent S selected from the group consisting of water, propylene carbonate, polyethylene glycols, diacetin, triacetin, ethylene glycol, diethylene glycol, triethylene glycol and tetraethylene glycol.

7. The process according to claim 1, wherein the plastic comprises:
   polyamides;
   polystyrenes;
   at least one copolymers of styrene selected from the group consisting of styrene/acrylonitrile copolymers SAN, acrylic ester/styrene/acrylonitrile copolymers ASA and acrylonitrile/butadiene/styrene copolymers ABS; or
   blends and/or multicomponent plastics thereof.

8. The process according to claim 1, wherein the plastic comprises acrylonitrile/butadiene/styrene copolymer ABS or a blend and/or multicomponent plastic comprising ABS.

9. The process according to claim 1, wherein the one or more metals comprise at least one metal selected from the group consisting of nickel, aluminium, copper, chromium, tin, zinc and alloys thereof.

10. The process according to claim 1, wherein, in the electrochemical coating in e), the at least one further metal layer is a layer consisting essentially of copper and/or nickel, and the at least one coating composition M' is a coating composition M2 comprising at least one copper compound and/or at least one nickel compound; and the process further comprises:

electrochemically coating the layer consisting essentially of copper and/or nickel with a layer consisting essentially of chromium, by electrochemically treating the layer consisting essentially of copper and/or nickel with a coating composition M3 comprising at least one chromium compound.

* * * * *